United States Patent
Yanai et al.

(10) Patent No.: US 9,382,479 B2
(45) Date of Patent: *Jul. 5, 2016

(54) LIQUID CRYSTAL COMPOUND, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Takayoshi Yanai, Chiba (JP); Norikatsu Hattori, Chiba (JP); Taketo Maeda, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/373,630

(22) PCT Filed: Dec. 28, 2012

(86) PCT No.: PCT/JP2012/084032
§ 371 (c)(1),
(2) Date: Jul. 22, 2014

(87) PCT Pub. No.: WO2013/114780
PCT Pub. Date: Aug. 8, 2013

(65) Prior Publication Data
US 2014/0361219 A1    Dec. 11, 2014

(30) Foreign Application Priority Data

Feb. 3, 2012    (JP) .................................. 2012-021649

(51) Int. Cl.
| | | |
|---|---|---|
| G02F 1/1333 | (2006.01) | |
| C09K 19/34 | (2006.01) | |
| C09K 19/44 | (2006.01) | |
| G02F 1/1362 | (2006.01) | |
| G02F 1/137 | (2006.01) | |
| C09K 19/46 | (2006.01) | |

(Continued)

(52) U.S. Cl.
CPC ......... *C09K 19/3402* (2013.01); *C09K 19/3003* (2013.01); *C09K 19/3066* (2013.01); *C09K 19/3068* (2013.01); *C09K 19/44* (2013.01); *C09K 19/46* (2013.01); *G02F 1/137* (2013.01); *G02F 1/1362* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/3019* (2013.01); *C09K 2019/3021* (2013.01); *C09K 2019/3025* (2013.01); *C09K 2019/3071* (2013.01); *C09K 2019/3077* (2013.01); *C09K 2019/3078* (2013.01); *C09K 2019/3083* (2013.01); *C09K 2019/3422* (2013.01); *G02F 2001/13706* (2013.01)

(58) Field of Classification Search
CPC .............. C09K 19/3402; C09K 19/44; C09K 19/3003; C09K 19/3066; C09K 19/3068; C09K 19/46; C09K 2019/0466; C09K 2019/123; C09K 2019/3004; C09K 2019/301; C09K 2019/3009; C09K 2019/3019; C09K 2019/3071; C09K 2019/3077; C09K 2019/3078; C09K 2019/3083; C09K 2019/3422; C09K 2019/122; C09K 2019/124; C09K 2019/3016; C09K 2019/3021; C09K 2019/3025; C09K 2019/3015; G02F 1/1362; G02F 1/137; G02F 1/1333; G02F 2001/13706
USPC ............... 252/299.01, 299.6, 299.61, 299.63; 428/1.1; 349/182, 183
See application file for complete search history.

(56) References Cited

U.S. PATENT DOCUMENTS

| | | | |
|---|---|---|---|
| 6,875,482 B2 | 4/2005 | Okabe et al. | |
| 7,732,021 B2 * | 6/2010 | Manabe | C07C 25/18 252/299.63 |

(Continued)

FOREIGN PATENT DOCUMENTS

| | | |
|---|---|---|
| CN | 101945976 | 1/2011 |
| CN | 102325761 | 1/2012 |

(Continued)

OTHER PUBLICATIONS

"International Search Report (Form PCT/ISA/210)", mailed on Feb. 19, 2013, with English translation thereof, p. 1-p. 4.

(Continued)

*Primary Examiner* — Geraldina Visconti
(74) *Attorney, Agent, or Firm* — Jianq Chyun IP Office

(57) ABSTRACT

A liquid crystal composition is described, satisfying at least one of characteristics such as a high maximum temperature of nematic phase, a low minimum temperature of nematic phase, a small viscosity, a suitable optical anisotropy, a large dielectric anisotropy, a large specific resistance, a high stability to ultraviolet light and a high stability to heat, or having a suitable balance regarding at least two of the characteristics. An AM LCD device including the liquid crystal composition is also described. The liquid crystal composition has a nematic phase and contains a specific compound having a large dielectric anisotropy as a first component, and a specific compound having a small viscosity as a second component, and may also contain a specific compound having a high maximum temperature or a large dielectric anisotropy as a third component.

11 Claims, No Drawings

(51) Int. Cl.
  *C09K 19/04* (2006.01)
  *C09K 19/12* (2006.01)
  *C09K 19/30* (2006.01)

(56) References Cited

U.S. PATENT DOCUMENTS

| | | | |
|---|---|---|---|
| 2006/0286308 | A1 | 12/2006 | Kirsch et al. |
| 2008/0277623 | A1 | 11/2008 | Manabe et al. |
| 2014/0183409 | A1* | 7/2014 | Gotoh .................... C09K 19/54 252/299.61 |
| 2015/0062495 | A1* | 3/2015 | Furusato ............ C09K 19/3402 349/85 |

FOREIGN PATENT DOCUMENTS

| | | |
|---|---|---|
| EP | 2182041 | 5/2010 |
| JP | 2001-316346 | 11/2001 |
| JP | 2007-503487 | 2/2007 |
| WO | 2009/115226 | 9/2009 |

OTHER PUBLICATIONS

Office Action of China Counterpart Application, issued on May 29, 2015, with English translation thereof, pp. 1-13.
Second Office Action of China Counterpart Application, issued on Jan. 27, 2016, pp. 1-15, with English translation thereof.

* cited by examiner

LIQUID CRYSTAL COMPOUND, LIQUID CRYSTAL COMPOSITION AND LIQUID CRYSTAL DISPLAY DEVICE

CROSS-REFERENCE TO RELATED APPLICATION

This application is a 371 application of the International PCT application serial no. PCT/JP2012/084032, filed on Dec. 28, 2012, which claims the priority benefits of Japan Patent Application No. 2012-021649 filed on Feb. 3, 2012. The entirety of each of the above-mentioned patent applications is hereby incorporated by reference herein and made a part of this specification.

TECHNICAL FIELD

The invention relates to a liquid crystal composition mainly suitable for use in an active matrix (AM) device and so forth, and an AM device and so forth including the composition. In particular, the invention relates to a liquid crystal composition having a positive dielectric anisotropy, and a device that includes the composition and has a mode such as a twisted nematic (TN) mode, an optically compensated bend (OCB) mode, an in-plane switching (IPS) mode, a fringe field switching (FFS) mode or a polymer sustained alignment (PSA) mode.

BACKGROUND ART

For liquid crystal display devices, a classification based on the operating mode of liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode, etc. A classification based on the driving mode of the device includes a passive matrix (PM) and an active matrix (AM). The PM types are classified into static type, multiplex type and so forth, and the AM type are classified into thin film transistor (TFT) type, metal insulator metal (MIM) type and so forth. The TFT types are further classified into amorphous silicon type and polycrystal silicon type. The latter is classified into a high temperature type and a low temperature type according to a production process. A classification based on the light source includes a reflective type utilizing natural light, a transmissive type utilizing backlight, and a transflective type utilizing both the natural light and the backlight.

The devices include a liquid crystal composition having suitable characteristics, which has a nematic phase. General characteristics of the composition should be improved to obtain an AM device having good general characteristics. Table 1 below summarizes the relationship between the general characteristics of the two aspects. The general characteristics of the composition will be further explained based on a commercially available AM device. The temperature range of the nematic phase relates to the temperature range in which the device can be used. A preferred maximum temperature of the nematic phase is about 70° C. or higher, and a preferred minimum temperature of the nematic phase is about −10° C. or lower. The viscosity of the composition relates to the response time of the device. A short response time is preferred for displaying moving images on the device. Accordingly, a small viscosity in the composition is preferred. A small viscosity at a low temperature is further preferred. The elastic constant of the composition relates to the contrast of the device. In order to increase the contrast in the device, a large elastic constant in the composition is further preferred.

TABLE 1

General Characteristics of Composition and AM Device

| No. | General Characteristics of Composition | General Characteristics of AM Device |
|---|---|---|
| 1 | Wide temperature range of a nematic phase | Wide usable temperature range |
| 2 | Small viscosity [1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

[1] A liquid crystal composition can be injected into a liquid crystal cell in a shorter period of time.

The optical anisotropy of the composition relates to the contrast ratio of the device. The product ($\Delta n \times d$) of the optical anisotropy ($\Delta n$) of the composition and the cell gap (d) of the device is designed so as to maximize the contrast ratio. The suitable value of the product depends on the type of the operating mode. The suitable value is about 0.45 μm in a device having the TN mode or the like. In the above case, a composition having a large optical anisotropy is preferred for a device having a small cell gap. A large dielectric anisotropy in the composition contributes to a low threshold voltage, a small electric power consumption and a large contrast ratio of the device. Accordingly, a large dielectric anisotropy is preferred. A large specific resistance in the composition contributes to a large voltage holding ratio and contributes to a large contrast ratio of the device. Accordingly, a composition having a large specific resistance at room temperature and also at a temperature close to the maximum temperature of the nematic phase in an initial stage is preferred. A composition having a large specific resistance at room temperature and also at a temperature close to the maximum temperature of the nematic phase even after the device has been used for a long period of time is preferred. Stability of the composition to UV light and heat relates to the service life of the LCD device. In the case where the stability is high, the device has a long service life. Such characteristics are preferred for an AM device for use in a liquid crystal projector, a liquid crystal television and so forth.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode or the FFS mode. A composition having a positive or negative dielectric anisotropy is used for an AM device having the PSA mode. Examples of the liquid crystal composition having the positive dielectric anisotropy are disclosed in patent literatures described below.

CITATION LIST

Patent Literature

Patent literature No. 1: JP 2007-503487 A.

A desirable AM device has characteristics such as a wide temperature range in which a device can be used, a short response time, a large contrast ratio, a low threshold voltage, a large voltage holding ratio and a long service life. A response time even shorter by one millisecond is desirable. Thus, desirable characteristics of a composition include a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant, etc.

SUMMARY OF INVENTION

Technical Problem

An object of the invention is a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant. Another object is a liquid crystal composition having a suitable balance between at least two of the characteristics. A further object is a liquid crystal display device including such a composition. Another object is a composition having a large optical anisotropy, a large dielectric anisotropy, a high stability to ultraviolet light, a large elastic constant and so forth, and is an AM device having a short response time, a large voltage holding ratio, a large contrast ratio, a long service life and so forth.

Solution to Problem

The invention concerns a liquid crystal composition that has a nematic phase and contains at least one compound selected from the group of compounds represented by formula (1) as a first component, and at least one compound selected from the group of compounds represented by formula (2) as a second component, and also concerns a liquid crystal display device including the composition:

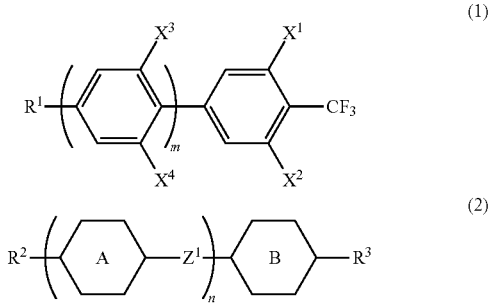

wherein $R^1$ is alkyl having 1 to 12 carbons, alkoxy having 1 to 12 carbons or alkenyl having 2 to 12 carbons, $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring A and ring B are independently 1,4-cyclohexylene, 1,4-phenylene, 2-fluoro-1,4-phenylene, 3-fluoro-1,4-phenylene or 2,5-difluoro-1,4-phenylene; $Z^1$ is independently a single bond, ethylene or carbonyloxy; $X^1$, $X^2$, $X^3$ and $X^4$ are independently hydrogen or fluorine; and m and n are independently 1, 2 or 3.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light and a high stability to heat. One aspect of the invention is a liquid crystal composition having a suitable balance between at least two of the characteristics. Another aspect is a liquid crystal display device including such a composition. A further aspect is a composition having a suitable optical anisotropy, a large dielectric anisotropy, a high stability to ultraviolet light, and so forth, and is an AM device having a short response time, a large voltage holding ratio, a large contrast ratio, a long service life and so forth.

DESCRIPTION OF EMBODIMENTS

Usage of terms herein is as described below. A liquid crystal composition or a liquid crystal display device according to the invention may be occasionally abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound or a polymerizable compound may be occasionally added to the composition. Even in the case where the compounds are liquid crystalline, the compounds are classified as an additive herein. At least one compound selected from the group of compounds represented by formula (1) may be occasionally abbreviated as "compound (1)." "Compound (1)" means one compound or two or more compounds represented by formula (1) The same rule applies to any other compound represented by any other formula. "At least one" in the context of "replaced" means that not only a position but also the number may be selected without restriction.

The higher limit of the temperature range of the nematic phase may be occasionally abbreviated as "maximum temperature." The lower limit of the temperature range of the nematic phase may be occasionally abbreviated as "minimum temperature." The expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. The expression "having a large voltage holding ratio" means that the device has a large voltage holding ratio at room temperature and also at a temperature close to the maximum temperature in an initial stage, and that the device has a large voltage holding ratio at room temperature and also at a temperature close to the maximum temperature of the nematic phase even after the device has been used for a long period of time. When characteristics such as an optical anisotropy are explained, the values obtained with the measuring methods described in Examples will be used. The first component includes one compound or two or more compounds. "Proportion of the first component" is expressed in terms of weight percent (wt %) of the first component based on the total weight of the liquid crystal composition. The proportions of the second component and so forth are expressed in a similar manner. The proportion of the additive mixed with the composition is expressed in terms of weight percent (wt %) or weight parts per million (ppm) based on the total weight of the liquid crystal composition.

The symbol $R^1$ is used for a plurality of compounds in the chemical formulae of the component compounds. The groups selected for $R^1$ may be identical or different in arbitrary two compounds described above. In one case, for example, $R^1$ of compound (1) is ethyl and $R^1$ of compound (1-1) is ethyl. In another case, $R^1$ of compound (1) is ethyl and $R^1$ of compound (1-1) is propyl. The same rule also applies to the symbol $R^2$, $X^5$, $Y^1$ or the like.

The invention includes the items described below.

Item 1 is a liquid crystal composition that has a nematic phase and contains at least one compound selected from the group of compounds represented by formula (1) as a first component, and at least one compound selected from the group of compounds represented by formula (2) as a second component:

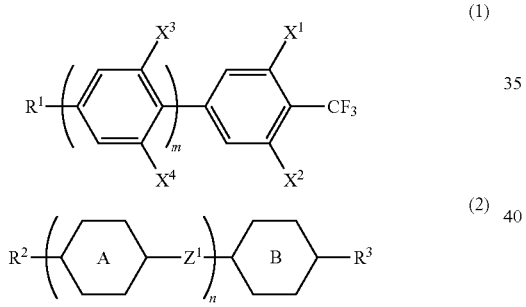

(1)

(2)

wherein $R^1$ is alkyl having 1 to 12 carbons, alkoxy having 1 to 12 carbons or alkenyl having 2 to 12 carbons, and $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring A and ring B are independently 1,4-cyclohexylene, 1,4-phenylene, 2-fluoro-1,4-phenylene, 3-fluoro-1,4-phenylene or 2,5-difluoro-1,4-phenylene; $Z^1$ is independently a single bond, ethylene or carbonyloxy; $X^1$, $X^2$, $X^3$ and $X^4$ are independently hydrogen or fluorine; and m and n are independently 1, 2 or 3.

Item 2 is the liquid crystal composition of item 1 in which the first component is at least one compound selected from the group of compounds represented by formulae (1-1) to (1-19):

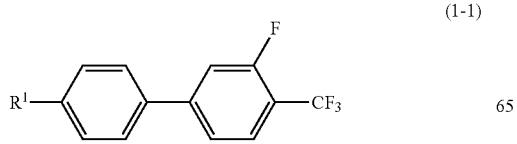

(1-1)

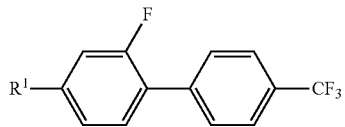

(1-2)

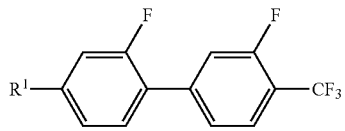

(1-3)

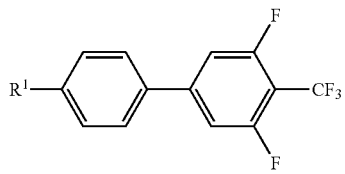

(1-4)

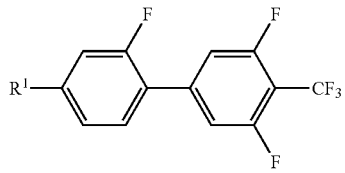

(1-5)

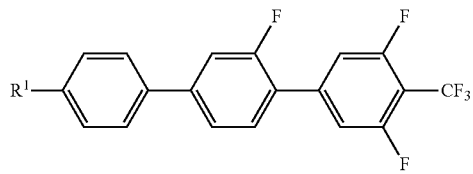

(1-6)

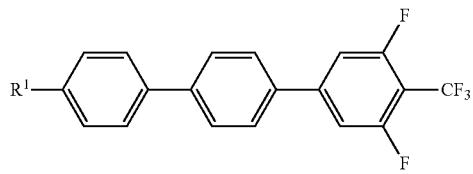

(1-7)

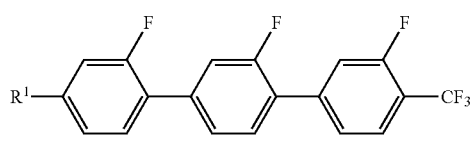

(1-8)

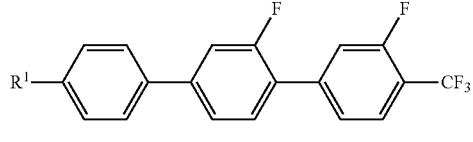

(1-9)

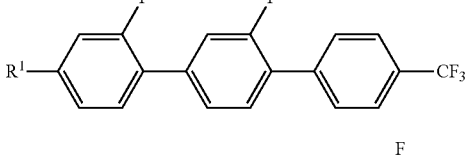

(1-10)

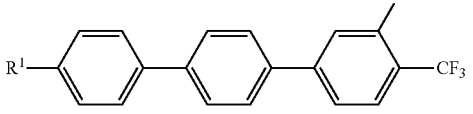

(1-11)

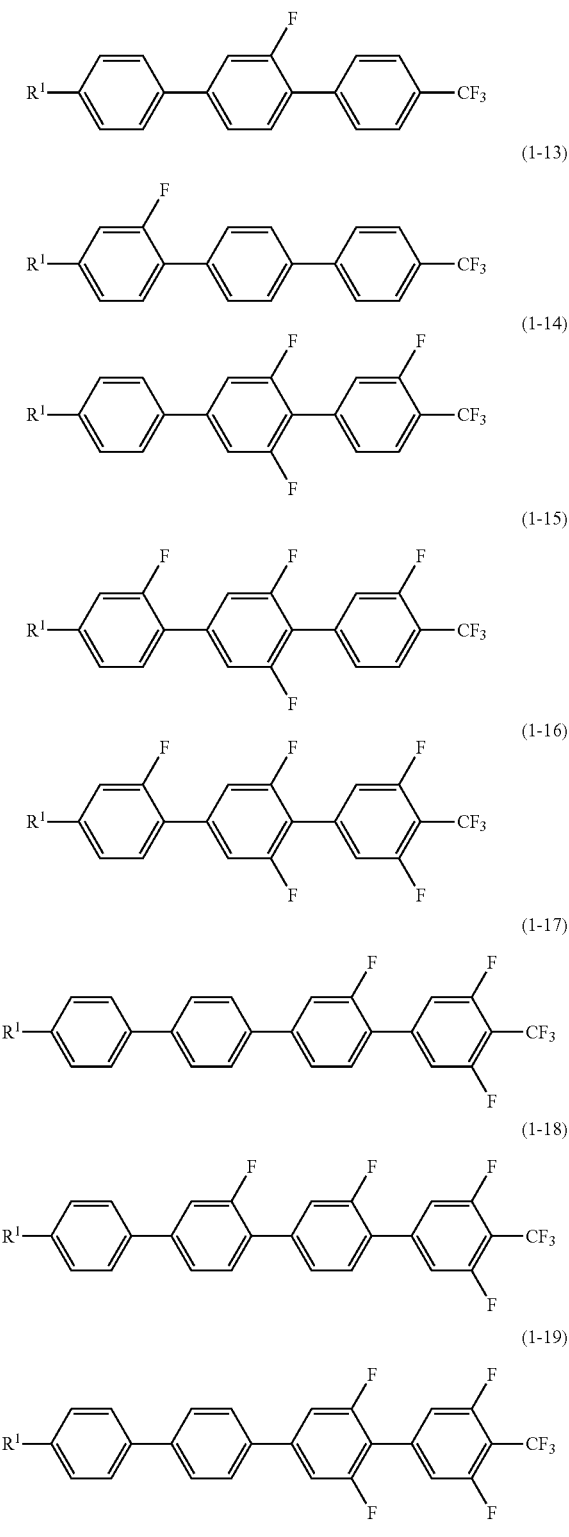

wherein R' is alkyl having 1 to 12 carbons, alkoxy having 1 to 12 carbons or alkenyl having 2 to 12 carbons.

Item 3 is the liquid crystal composition of item 1 in which the first component is at least one compound selected from the group of compounds represented by formula (1-1) of item 2.

Item 4 is the liquid crystal composition of item 1 in which the first component is at least one compound selected from the group of compounds represented by formula (1-17) of item 2.

Item 5 is the liquid crystal composition of any one of items 1 to 4 in which the second component is at least one compound selected from the group of compounds represented by formulae (2-1) to (2-13):

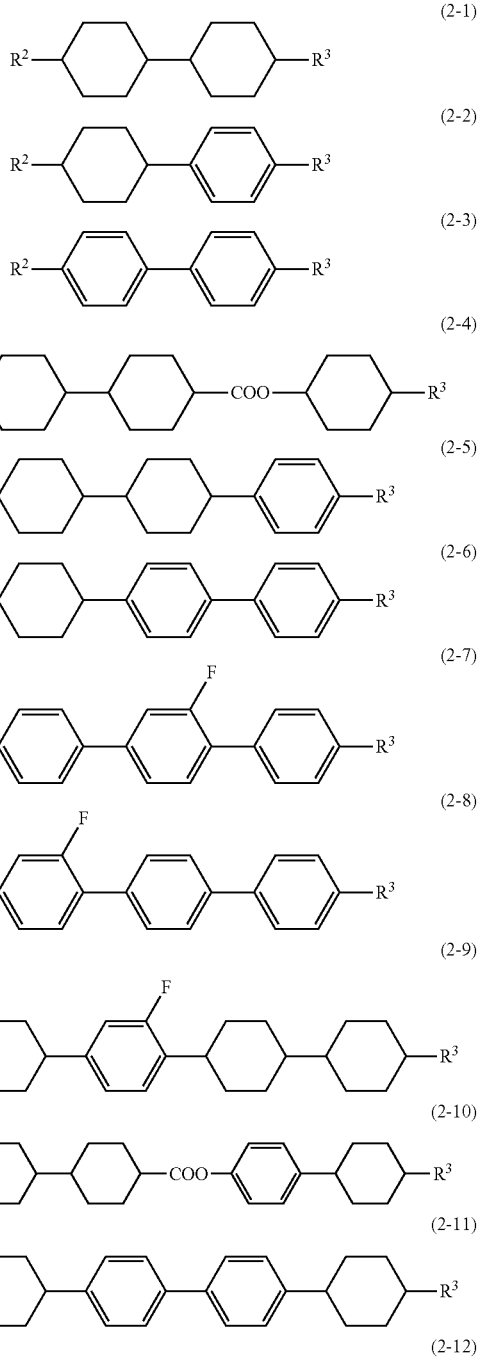

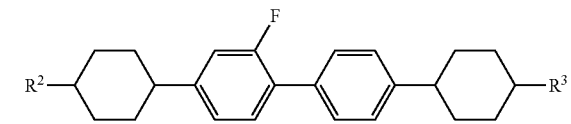

-continued (2-13)

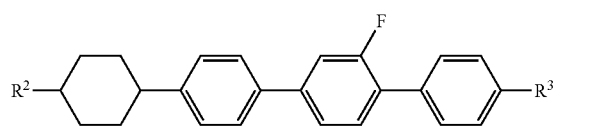

wherein R² and R³ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine.

Item 6 is the liquid crystal composition of item 1 in which the second component is at least one compound selected from the group of compounds represented by formula (2-1) of item 5.

Item 7 is the liquid crystal composition of item 1 in which the second component is at least one compound selected from the group of compounds represented by formula (2-13) of item 5.

Item 8 is the liquid crystal composition of item 1 in which the second component is a mixture of at least one compound selected from the group of compounds represented by formula (2-1) of item 5 and at least one compound selected from the group of compounds represented by formula (2-7) of item 5.

Item 9 is the liquid crystal composition of any one of items 1 to 8 in which the proportion of the first component is in the range of 3 wt % to 25 wt % and the proportion of the second component is in the range of 25 wt % to 97 wt %, based on the total weight of the liquid crystal composition.

Item 10 is the liquid crystal composition of any one of items 1 to 9 which further contains at least one compound selected from the group of compounds represented by formula (3) as a third component:

(3)

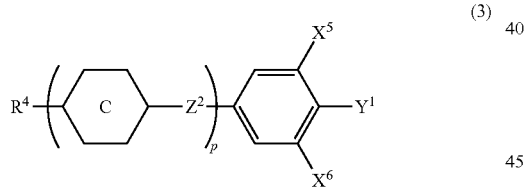

wherein R⁴ is alkyl having 1 to 12 carbons, alkoxy having 1 to 12 carbons or alkenyl having 2 to 12 carbons; ring C is 1,4-cyclohexylene, 1,4-phenylene, 2-fluoro-1,4-phenylene, 3-fluoro-1,4-phenylene, 3,5-difluoro-1,4-phenylene, 1,3-dioxane-2,5-diyl, tetrahydropyran-2,5-diylorpyrimidine-2,5-diyl; Z² is a single bond, difluoromethyleneoxy, ethylene or carbonyloxy; X⁵ and X⁶ are independently hydrogen or fluorine; Y¹ is fluorine, chlorine or trifluoromethoxy; and p is 1, 2, 3 or 4.

Item 11 is the liquid crystal composition of item 10 in which the third component is at least one compound selected from the group of compounds represented by formulae (3-1) to (3-24):

(3-1)

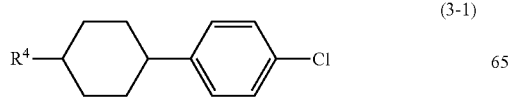

(3-2)

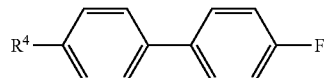

(3-3)

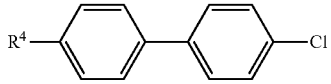

(3-4)

(3-5)

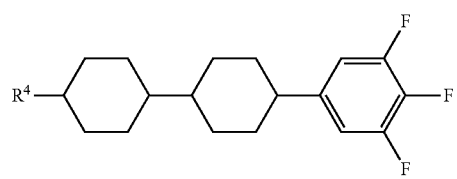

(3-6)

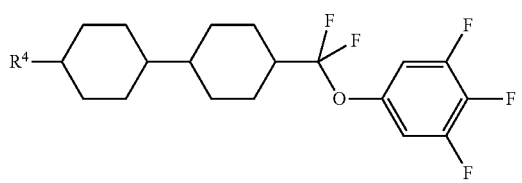

(3-7)

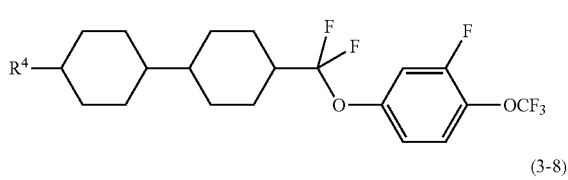

(3-8)

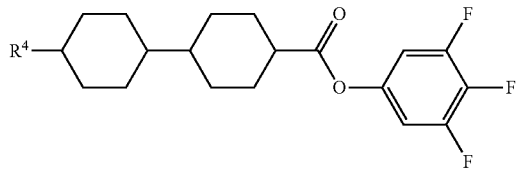

(3-9)

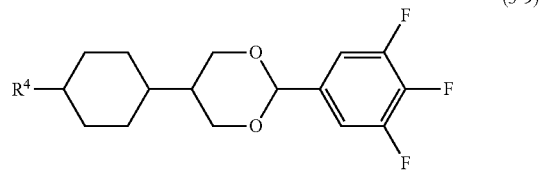

(3-10)

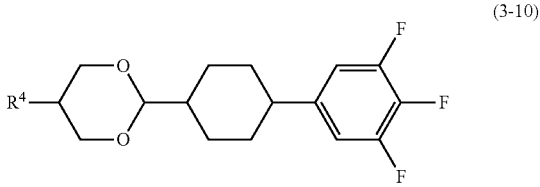

(3-11)

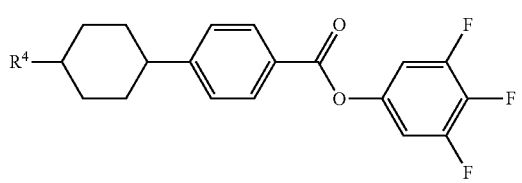

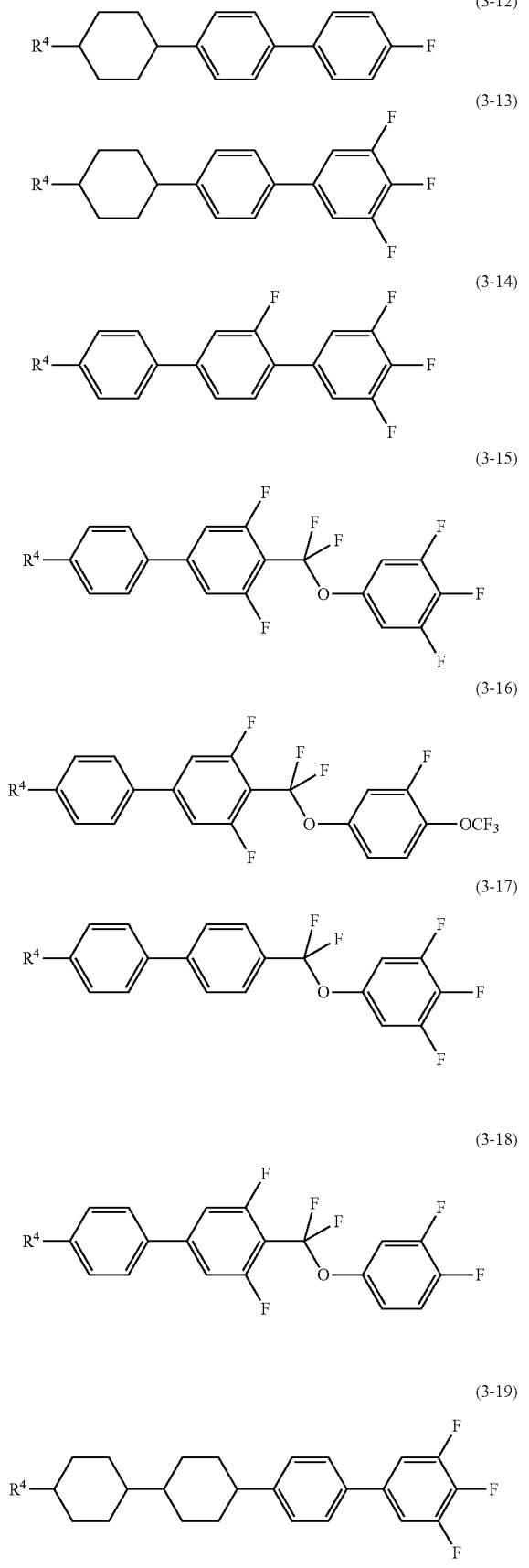
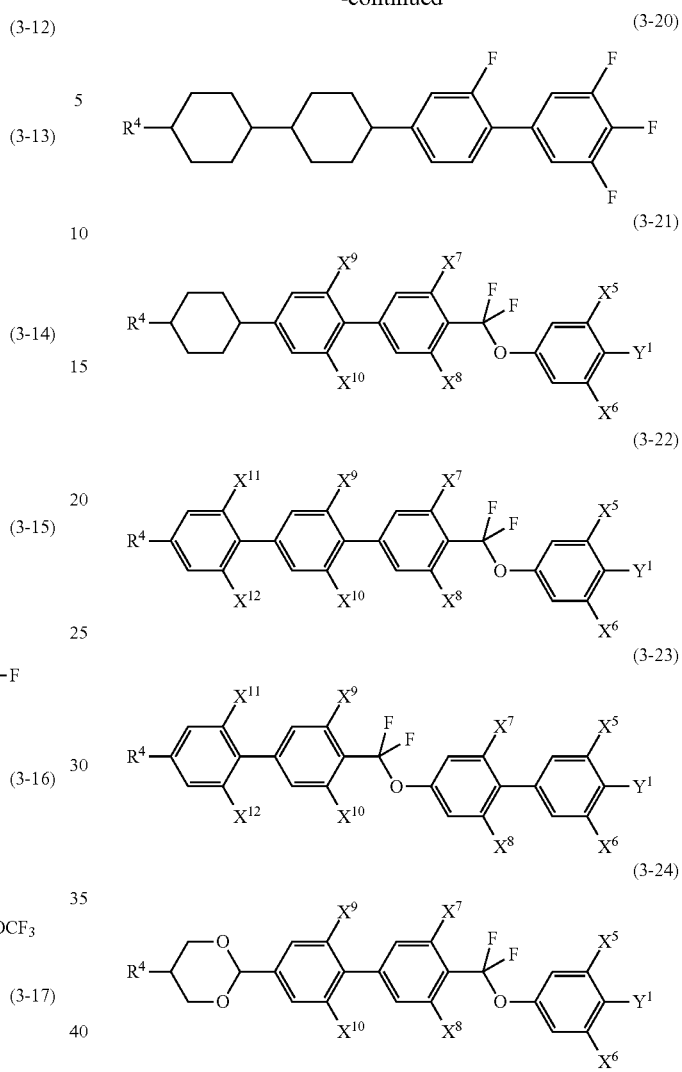

wherein, $R^4$ is alkyl having 1 to 12 carbons, alkoxy having 1 to 12 carbons or alkenyl having 2 to 12 carbons; $X^5$, $X^6$, $X^7$, $X^8$, $X^9$, $X^{10}$, $X^{11}$ and $X^{12}$ are independently hydrogen or fluorine; and $Y^1$ is fluorine, chlorine or trifluoromethoxy.

Item 12 is the liquid crystal composition of item 10 in which the third component is at least one compound selected from the group of compounds represented by formula (3-14) of item 11.

Item 13 is the liquid crystal composition of item 10 in which the third component is at least one compound selected from the group of compounds represented by formula (3-15) of item 11.

Item 14 is the liquid crystal composition of item 10 in which the third component is at least one compound selected from the group of compounds represented by formula (3-17) of item 11.

Item 15 is the liquid crystal composition of item 10 in which the third component is at least one compound selected from the group of compounds represented by formula (3-21) of item 11.

Item 16 is the liquid crystal composition of item 10 in which the third component is at least one compound selected from the group of compounds represented by formula (3-22) of item 11.

Item 17 is the liquid crystal composition of any one of items 10 to 16 in which the proportion of the third component is in the range of 5 wt % to 65 wt % based on the total weight of the liquid crystal composition.

Item 18 is the liquid crystal composition of any one of items 1 to 17 of which the maximum temperature of nematic phase is 70° C. or higher, the optical anisotropy (25° C.) at the wavelength of 589 nm is 0.07 or more, and the dielectric anisotropy (25° C.) at the frequency of 1 kHz is 2 or more.

Item 19 is a liquid crystal display device including the liquid crystal composition of any one of items 1 to 18.

Item 20 is the liquid crystal display device of item 19 of which the operating mode is a TN mode, an ECB mode, an OCB mode, an IPS mode, a PSA mode or an FPA mode, and the driving mode is an active matrix mode.

Item 21 is use of the liquid crystal composition of any one of items 1 to 18 in a liquid crystal display device.

The invention further includes the following items: 1) the composition further containing an optically active compound; 2) the composition further containing an additive such as an antioxidant, an ultraviolet light absorber, an antifoaming agent, a polymerizable compound and a polymerization initiator; 3) an AM device including the composition; 4) a device including the composition and having a TN, ECB, OCB, IPS, FFS or PSA mode; 5) a transmissive device including the composition; 6) use of the composition as a composition having the nematic phase; and 7) use as an optically active composition by adding the optically active compound to the composition.

The composition of the invention will be explained in the order below. First, the constitution of the component compounds in the composition is explained. Second, the main characteristics of the component compound and the main effect of a compound on the composition is explained. Third, the combination of components in the composition, the preferred proportions of the component compounds and the basis thereof are explained. Fourth, preferred embodiments of the component compounds are explained. Fifth, specific examples of the component compounds are shown. Sixth, additives that may be mixed with the composition are described. Seventh, methods for synthesizing the component compounds are explained. Last, the application of the composition is described.

First, the constitution of the component compounds in the composition is explained. The compositions of the invention are classified into composition A and composition B. Composition A may further contain any other liquid crystal compound, an additive, an impurity or the like in addition to the liquid crystal compounds selected from compounds (1), (2) and (3). "Any other liquid crystal compound" means a liquid crystal compound different from compounds (1), (2) and (3). Such a compound is mixed with the composition for the purpose of further adjusting the characteristics. The additives include an optically active compound, an antioxidant, a UV light absorbent, a dye, an antifoaming agent, a polymerizable compound and a polymerization initiator. The impurity includes a compound mixed in a process such as preparation of the component compounds. Even in the case where the compound is liquid crystalline, the compound is classified as the impurity herein.

Composition B consists essentially of compounds selected from compounds (1), (2) and (3). The term "essentially" means that the composition may contain an additive and an impurity, but does not contain any liquid crystal compound different from the compounds. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition are explained. The main characteristics of the component compounds are summarized in Table 2 on the basis of advantageous effects of the invention. In Table 2, the symbol L stands for "large" or "high," the symbol M stands for "medium," and the symbol S stands for "small" or "low." The symbols L, M and S represent a classification based on a qualitative comparison among the component compounds, and 0 (zero) means "a value being nearly zero."

TABLE 2

Characteristics of Compounds

| Compounds | Compound (1) | Compound (2) | Compound (3) |
|---|---|---|---|
| Maximum temperature | S to M | S to L | S to L |
| Viscosity | L | S to M | M to L |
| Optical anisotropy | L | S to L | S to L |
| Dielectric anisotropy | M to L | 0 | S to L |
| Specific resistance | L | L | L |

Upon mixing the component compounds with the composition, the main effects of the component compounds on the characteristics of the composition are as described below. Compound (1) increases the optical anisotropy and increases the dielectric anisotropy. Compound (2) increases the maximum temperature, decreases the minimum temperature and decreases the viscosity. Compound (3) increases the maximum temperature and increases the dielectric anisotropy.

Third, the combination of components in the composition, the preferred proportions of the component compounds and the bases thereof are explained. Combinations of the components in the composition include a combination of the first component and the second component, and a combination of the first component, the second component and the third component, wherein the latter combination is preferred for increasing the dielectric anisotropy, for decreasing the viscosity or for decreasing the minimum temperature.

A preferred proportion of the first component is approximately not less than 3 wt % for increasing the dielectric anisotropy, and approximately not more than 25 wt % for decreasing the minimum temperature. A further preferred proportion is in the range of about 5 wt % to about 20 wt %. A particularly preferred proportion is in the range of about 7 wt % to about 15 wt %.

A preferred proportion of the second component is approximately not less than 25 wt % for increasing the maximum temperature or decreasing the viscosity, and approximately not more than 97% for decreasing the minimum temperature. A further preferred proportion is in the range of about 30 wt % to about 80 wt %. A particularly preferred proportion is in the range of about 35 wt % to about 75 wt %.

A preferred proportion of the third component is approximately not less than 5 wt % for increasing the dielectric anisotropy, and approximately not more than 65 wt % for decreasing the minimum temperature. A further preferred proportion is in the range of about 10 wt % to about 60 wt %. A particularly preferred proportion is in the range of about 15 wt % to about 55 wt %.

Fourth, the preferred embodiments of the component compounds are described. $R^1$ and $R^4$ are independently alkyl having 1 to 12 carbons, alkoxy having 1 to 12 carbons or alkenyl having 2 to 12 carbons. Preferred $R^1$ or $R^4$ is alkyl having 1 to 12 carbons for increasing the stability to UV light or the stability to heat. $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine. Preferred $R^2$ or $R^3$ is alkenyl having 2 to 5 carbons for decreasing the viscosity, or is alkyl having 1 to 7 carbons for increasing the stability to UV light or the stability to heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. The preferred configuration of —CH═CH— in the alkenyl depends on the position of the double bond. Trans is preferred in the alkenyl such as 1-propenyl, 1-butenyl, 1-pentenyl, 1-hexenyl, 3-pentenyl, and 3-hexenyl for decreasing the viscosity. C is preferred in the alkenyl such as 2-butenyl, 2-pentenyl and 2-hexenyl.

Preferred examples of alkenyl in which at least one hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl, and 4,4-difluoro-3-butenyl for decreasing the viscosity.

The above alkyl does not include cyclic alkyl. The above alkoxy does not include cyclic alkoxy. The above alkenyl does not include cyclic alkenyl. With regard to the configuration of 1,4-cyclohexylene, trans is preferred to cis for increasing the maximum temperature.

Ring A and ring B are independently 1,4-cyclohexylene, 1,4-phenylene, 2-fluoro-1,4-phenylene, 3-fluoro-1,4-phenylene or 2,5-difluoro-1,4-phenylene. Arbitrary two rings A when n is 2 or 3 may be identical or different. Preferred ring A or ring B is 1,4-cyclohexylene for decreasing the viscosity, or 1,4-phenylene for increasing the optical anisotropy. Ring C is 1,4-cyclohexylene, 1,4-phenylene, 2-fluoro-1,4-phenylene, 3-fluoro-1,4-phenylene, 3,5-difluoro-1,4-phenylene, 1,3-dioxane-2,5-diyl, tetrahydropyran-2,5-diyl or pyrimidine-2,5-diyl. Arbitrary two rings C when p is 2, 3 or 4 may be identical or different. Preferred ring C is 1,4-cyclohexylene for increasing the maximum temperature, 1,4-phenylene for increasing the optical anisotropy, or 3,5-difluoro-1,4-phenylene for increasing the dielectric anisotropy.

$Z^1$ is a single bond, ethylene or carbonyloxy. Arbitrary two $Z^1$ when n is 2 or 3 may be identical or different. Preferred $Z^1$ is a single bond for decreasing the viscosity, or carbonyloxy for increasing the maximum temperature. $Z^2$ is a single bond, difluoromethyleneoxy, ethylene or carbonyloxy. Arbitrary two $Z^2$ when p is 2, 3 or 4 may be identical or different. Preferred $Z^2$ is a single bond for decreasing the viscosity, or difluoromethyleneoxy for increasing the dielectric anisotropy.

$X^1$, $X^2$, $X^3$, $X^4$, $X^5$, $X^6$, $X^7$, $X^8$, $X^9$, $X^{10}$, $X^{11}$ and $X^{12}$ are independently hydrogen or fluorine. Preferred $X^1$, $X^2$, $X^3$, $X^4$, $X^5$, $X^6$, $X^7$, $X^8$, $X^9$, $X^{10}$, $X^{11}$ or $X^{12}$ is fluorine for increasing the dielectric anisotropy, or hydrogen for decreasing the viscosity.

$Y^1$ is fluorine, chlorine, trifluoromethoxy or trifluoromethyl. Preferred $Y^1$ is fluorine for decreasing the viscosity.

Then, m is 1, 2 or 3. Preferred m is 1 for decreasing the viscosity, or 2 or 3 for increasing the maximum temperature.

Further, n is 1, 2 or 3. Preferred n is 1 for decreasing the viscosity, or 3 for increasing the maximum temperature.

Further, p is 1, 2, 3 or 4. Preferred p is 2 for increasing the maximum temperature, or 3 for increasing the stability to UV light or heat.

Fifth, specific examples of the component compounds are shown. In the preferred compounds described below, $R^5$ is alkyl having 1 to 12 carbons or alkenyl having 2 to 12 carbons, and $R^6$ is independently alkyl having 1 to 12 carbons or alkoxy having 1 to 12 carbons. $R^7$ and $R^8$ are independently straight-chain alkyl having 1 to 12 carbons or straight-chain alkenyl having 2 to 12 carbons. $R^9$ is independently straight-chain alkyl having 1 to 12 carbons.

Preferred compound (1) includes compounds (1-1-1) to (1-19-1). Further preferred compound (1) includes compounds (1-6-1) and (1-17-1). Particularly preferred compound (1) includes compound (1-6-1). Preferred compound (2) includes compounds (2-1-1) to (2-13-1). Further preferred compound (2) includes compounds (2-1-1), (2-5-1), (2-7-1), (2-10-1) and (2-13-1). Particularly preferred compound (2) includes compound (2-1-1). Preferred compound (3) includes compounds (3-1-1) to (3-24-1). Further preferred compound (3) includes compounds (3-5-1), (3-6-1), (3-14-1), (3-15-1), (3-19-1), (3-21-1) and (3-22-1). Particularly preferred compound (3) includes compounds (3-14-1), (3-15-1), (3-21-1) and (3-22-1).

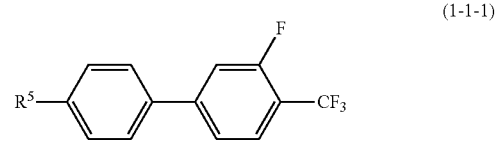

(1-1-1)

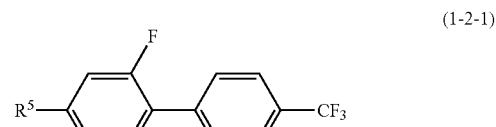

(1-2-1)

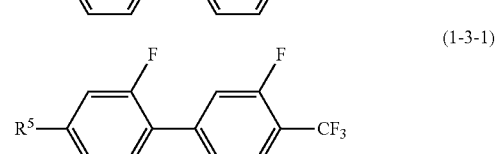

(1-3-1)

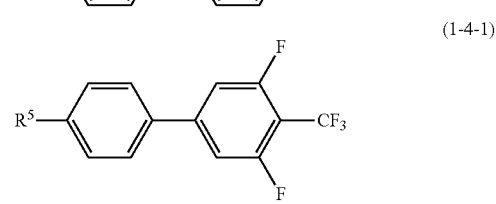

(1-4-1)

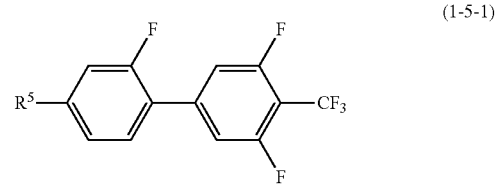

(1-5-1)

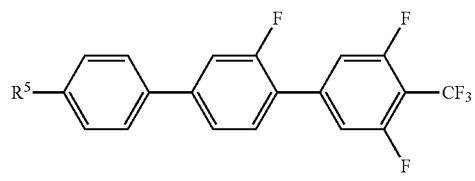 (1-6-1)
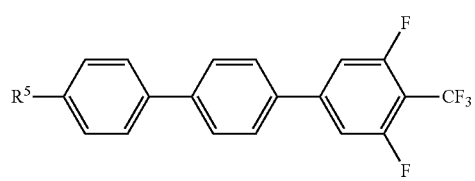 (1-7-1)
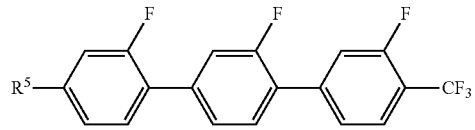 (1-8-1)
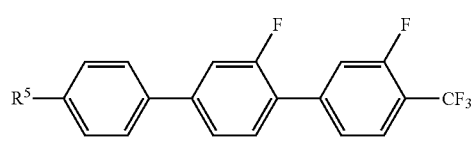 (1-9-1)
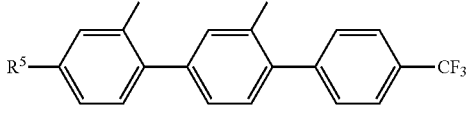 (1-10-1)
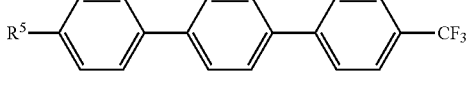 (1-11-1)
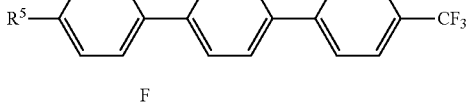 (1-12-1)
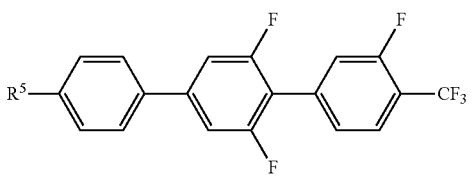 (1-13-1)
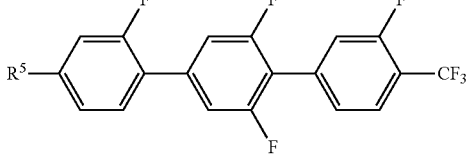 (1-14-1)
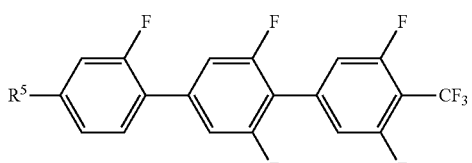 (1-15-1)
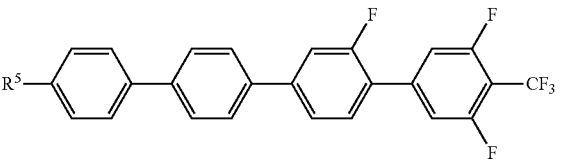 (1-16-1)
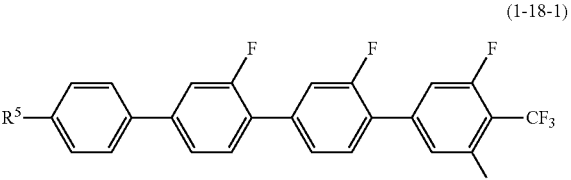 (1-17-1)
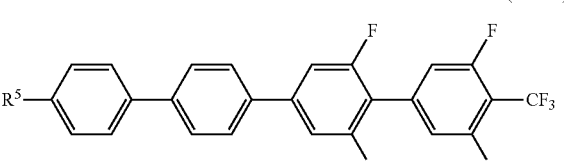 (1-18-1)
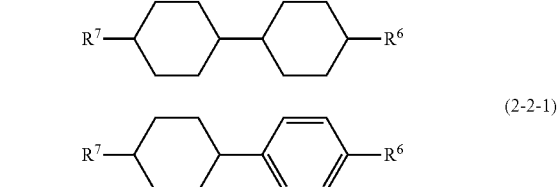 (1-19-1)
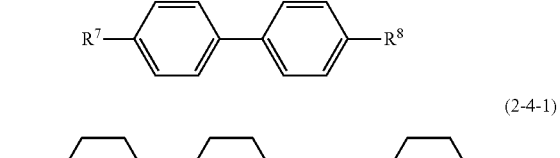 (2-1-1)
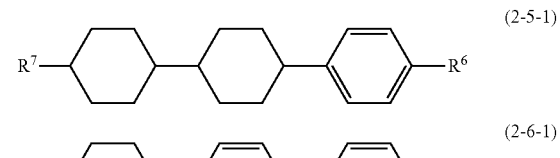 (2-2-1)
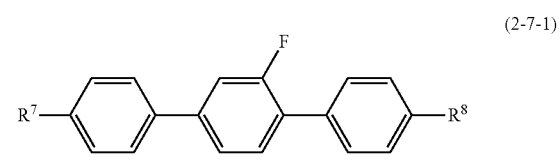 (2-3-1)

(2-8-1)
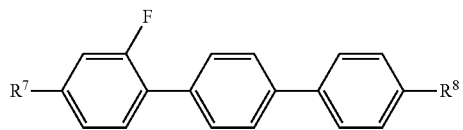
(2-9-1)
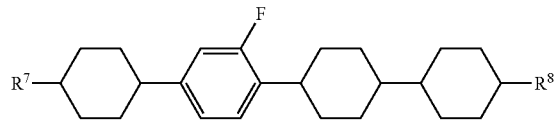
(2-10-1)
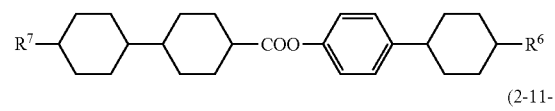
(2-11-1)
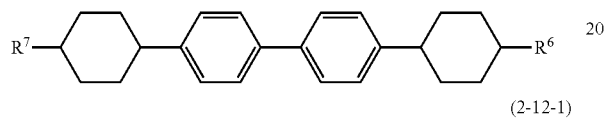
(2-12-1)
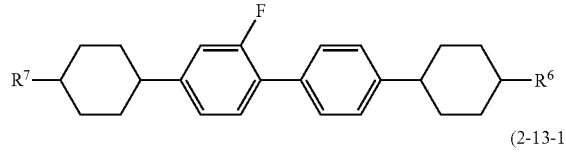
(2-13-1)
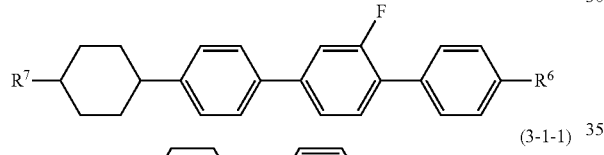
(3-1-1)
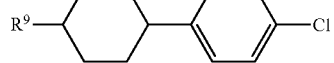
(3-2-1)
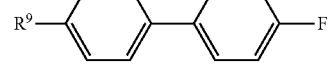
(3-3-1)
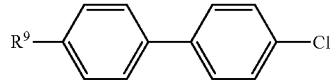
(3-4-1)
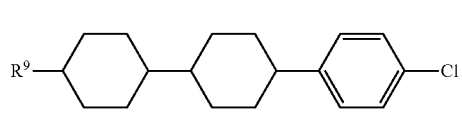
(3-5-1)
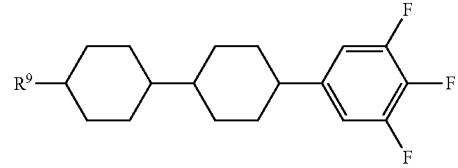
(3-6-1)
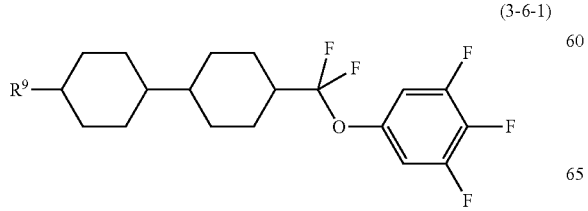
(3-7-1)
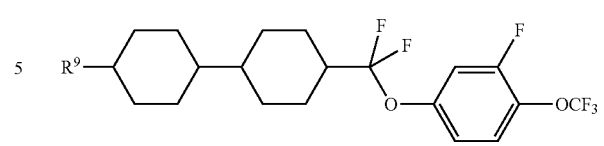
(3-8-1)
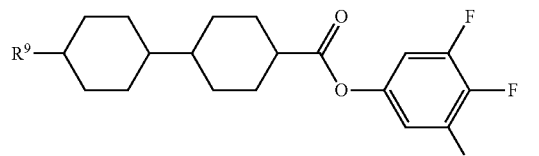
(3-9-1)
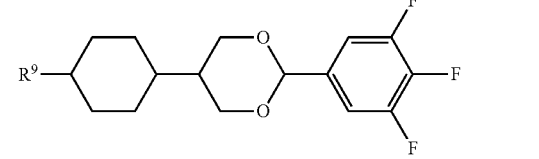
(3-10-1)
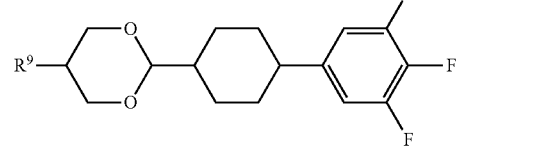
(3-11-1)
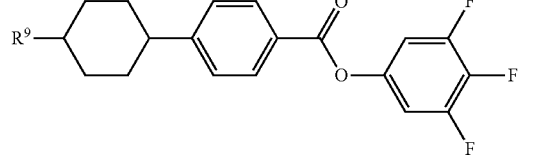
(3-12-1)
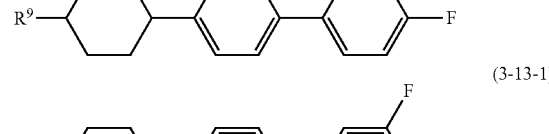
(3-13-1)
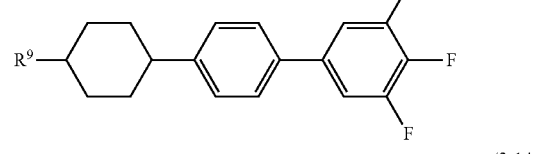
(3-14-1)
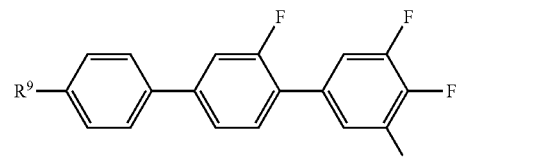
(3-15-1)
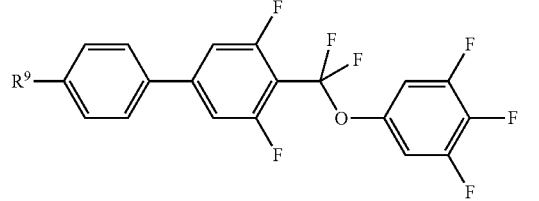

(3-16-1)
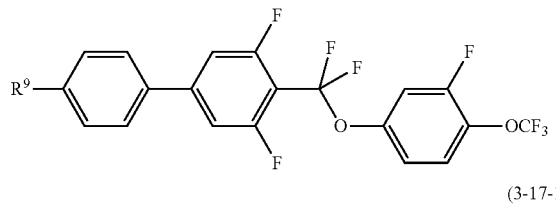

(3-17-1)
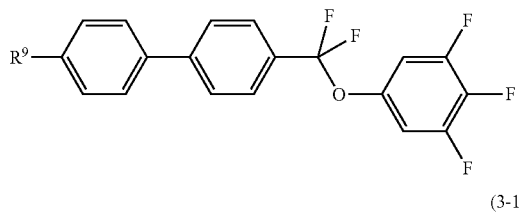

(3-18-1)
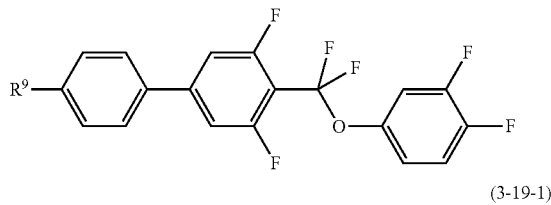

(3-19-1)
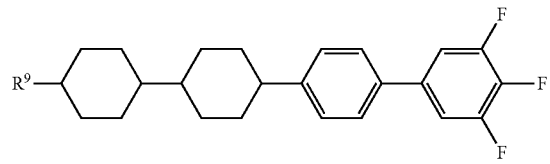

(3-20-1)
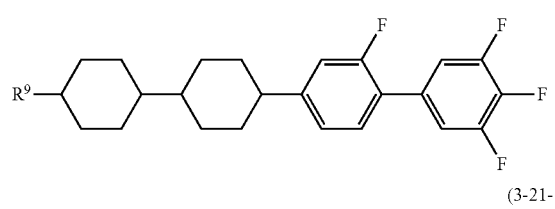

(3-21-1)
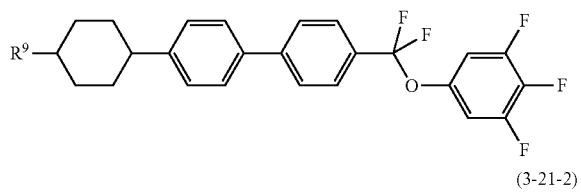

(3-21-2)
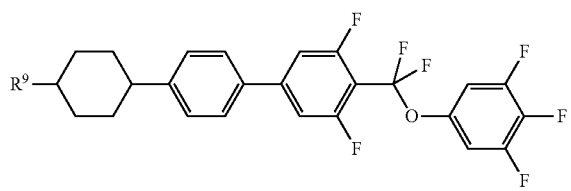

(3-21-3)
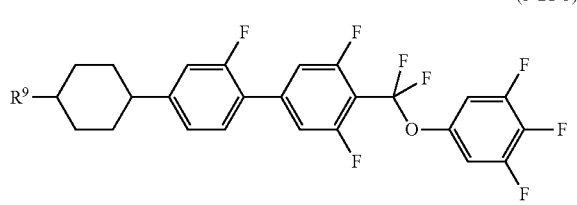

(3-22-1)
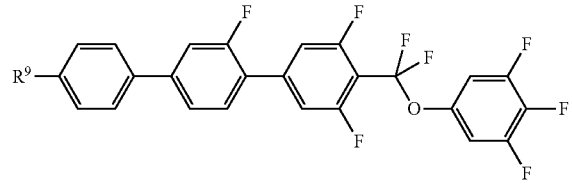

(3-22-2)
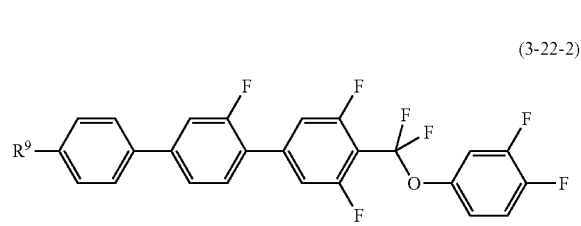

(3-23-1)
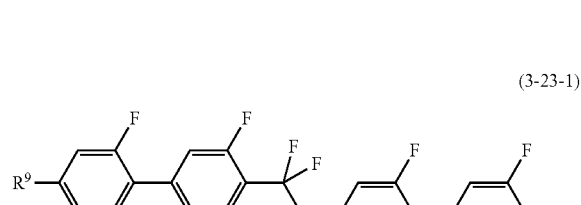

(3-24-1)
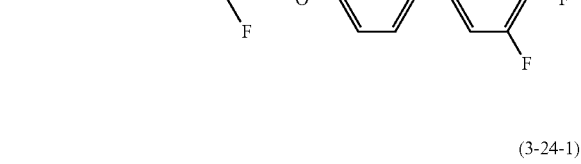

Sixth, the additives that may be mixed with the composition are described. Such additives include an optically active compound, an antioxidant, a UV light absorbent, a dye, an antifoaming agent, a polymerizable compound and a polymerization initiator. The optically active compound is mixed with the composition for the purpose of inducing a helical structure in liquid crystals to give a twist angle. Examples of such a compound include compounds (4-1) to (4-5). A preferred proportion of the optically active compound is approximately not more than 5 wt %. A further preferred proportion is in the range of about 0.01 wt % to about 2 wt %.

(4-1)
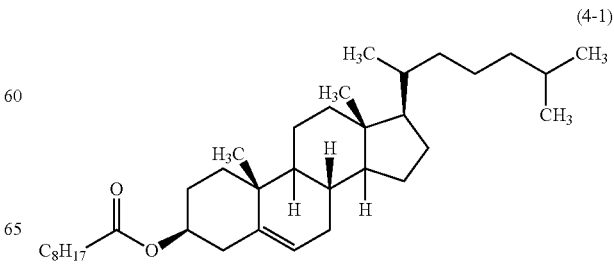

-continued

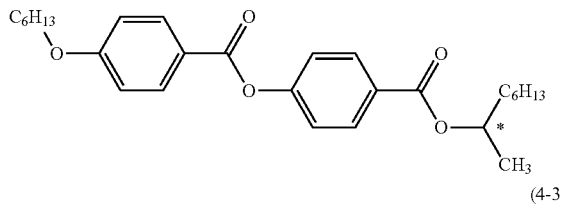

(4-2)

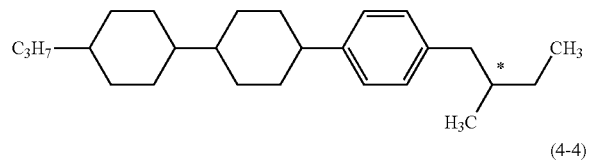

(4-3)

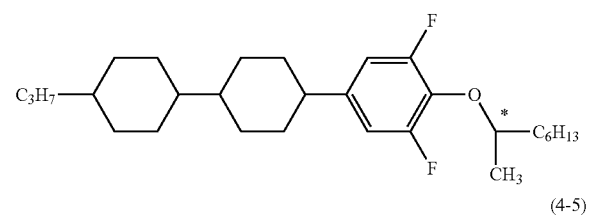

(4-4)

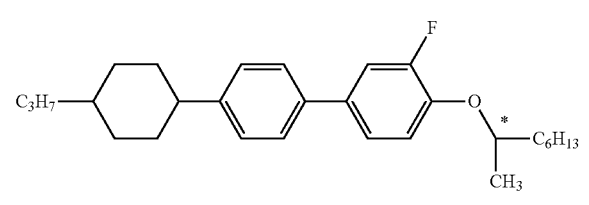

(4-5)

The antioxidant is mixed in the composition in order to prevent a decrease in the specific resistance caused by heating in air, or to maintain a large voltage holding ratio at room temperature and also at a temperature close to the maximum temperature of the nematic phase even after the device has been used for a long period of time.

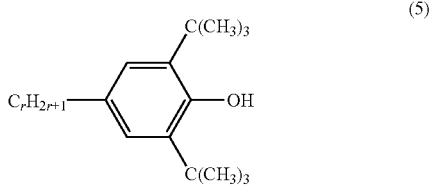

(5)

Preferred examples of the antioxidant include compound (5) where r is an integer of from 1 to 9. In compound (5), r is preferably 1, 3, 5, 7 or 9, and is further preferably 1 or 7. Compound (5) where r is 1 is effective in preventing a decrease in the specific resistance caused by heating in air, as having a large volatility. Compound (5) where r is 7 is effective in maintaining a large voltage holding ratio at room temperature and also at a temperature close to the maximum temperature of the nematic phase even after the device has been used for a long period of time, as having a small volatility. A preferred proportion of the antioxidant is approximately not less than 50 ppm for achieving the effect thereof, and approximately not more than 600 ppm for avoiding a decrease in the maximum temperature or avoiding an increase in the minimum temperature. A further preferred proportion is in a range of about 100 ppm to about 300 ppm.

Preferred examples of the UV light absorbent include a benzophenone derivative, a benzoate derivative and a triazole derivative. A light stabilizer such as an amine having steric hindrance is also preferred. A preferred proportion of the UV light absorbent or the stabilizer is approximately not less than 50 ppm for achieving the effect thereof, and approximately not more than 10,000 ppm for avoiding a decrease in the maximum temperature or avoiding an increase in the minimum temperature. A further preferred proportion is in the range of about 100 ppm to about 10,000 ppm.

A dichroic dye such as an azo dye or an anthraquinone dye is mixed in the composition to adapt it to a device having a guest host (GH) mode. A preferred proportion of the dye is in the range of about 0.01 wt % to about 10 wt %. The antifoaming agent such as dimethyl silicone oil or methyl phenyl silicone oil is mixed in the composition for preventing foam formation. A preferred proportion of the antifoaming agent is approximately not less than 1 ppm for achieving the effect thereof, and approximately not more than 1,000 ppm for avoiding a poor display. A further preferred proportion is in the range of about 1 ppm to about 500 ppm.

The polymerizable compound is mixed in the composition to adapt it to a device having the polymer sustained alignment (PSA) mode. Preferred examples of the polymerizable compound include compounds having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate derivative or a methacrylate derivative. A preferred proportion of the polymerizable compound is approximately not less than 0.05 wt % for achieving the effect thereof, and approximately not more than 10 wt % for avoiding a poor display. A further preferred proportion is in the range of about 0.1 wt % to about 2 wt %. The polymerizable compound is preferably polymerized by irradiation with UV light or the like in the presence of a suitable initiator such as a photopolymerization initiator. Suitable conditions for the polymerization, suitable types of the initiator and suitable amounts thereof are known to a person skilled in the art and are described in literatures. For example, Irgacure 651 (registered trademark; BASF), Irgacure 184 (registered trademark; BASF) or Darocure 1173 (registered trademark; BASF), each being the photopolymerization initiator, is suitable for radical polymerization. A preferred proportion of the photo-polymerization initiator is in the range of about 0.1 wt % to about 5 wt % of the polymerizable compound, and a particularly preferred proportion is in the range of about 1 wt % to about 3 wt %.

Seventh, the methods for synthesizing the component compounds are described. Compounds (1) to (3) can be synthesized with known methods, which are exemplified below. Compound (1-6-1) is prepared by the method described in JP 2007-503487 A. Compound (2-1-1) is prepared by the method described in JP S59-70624 A and JP S59-176221 A. Compound (2-5-1) is prepared by the method described in JP S57-165328 A and JP S59-176221 A. Compound (3-5-1) is prepared by the method described in JP H2-233626 A. Compounds (3-15-1), (3-21-1) and (3-22-1) are prepared by the method described in JP H10-251186 A. The antioxidant is commercially available. A compound represented by formula (5) where r is 1 is available from Sigma-Aldrich Corporation. Compound (5) where r is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Maruzen Co., Ltd.). The composition is prepared according to publicly known methods using the thus obtained compounds. For example, the component compounds are mixed and dissolved in each other by heating.

Last, the application of the composition is explained. The composition of the invention mainly has a minimum temperature of about −10° C. or lower, a maximum temperature of about 70° C. or higher, and an optical anisotropy in the range of about 0.07 to about 0.20. A device including the composition has a large voltage holding ratio. The composition is suitable for use in the AM device. The composition is particularly suitable for use in a transmissive AM device. A composition having an optical anisotropy in the range of about 0.08 to about 0.25, and also a composition having an optical anisotropy in the range of about 0.10 to about 0.30 may be prepared by controlling the ratio of the component compounds or by mixing any other liquid crystal compound with the component compounds. The composition can be used as a composition having a nematic phase, and as an optically active composition by adding the optically active compound.

The composition can be used for AM devices, and can also be used for PM devices. The composition can be used for an AM device and a PM device having a mode such as PC, TN, STN, ECB, OCB, IPS, FFS, VA or PSA. Use for an AM device having the TN, OCB, IPS or FFS mode is particularly preferred. In an AM device having the IPS mode or FFS mode, alignment of liquid crystal molecules in a state in which no voltage is applied may be parallel or perpendicular to a panel substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, and for a polymer dispersed (PD) device in which a three-dimensional network-polymer is formed in the composition.

EXAMPLES

In order to evaluate characteristics of a composition and a compound to be contained in the composition, the composition and the compound were made a measurement object. When the measurement object was a composition, it was measured as a sample as is, and the values obtained were described. When the measurement object was a compound, a sample for measurement was prepared by mixing the compound (15 wt. %) with a base liquid crystal (85 wt %). The values of characteristics of the compound were calculated using the values obtained by the measurement, according to an extrapolation method: (extrapolated value)={(measured value of a sample for measurement)−0.85×(measured value of base liquid crystal)}/0.15. When a smectic phase (or crystals) precipitated at the ratio thereof at 25° C., a ratio of the compound to the base liquid crystal was changed step by step in the order of (10 wt %:90 wt %), (5 wt %:95 wt %) and (1 wt %:99 wt %). The values of the maximum temperature, the optical anisotropy, the viscosity and the dielectric anisotropy with regard to the compound were obtained according to the extrapolation method.

Components of the base liquid crystal were as described below. The proportion of each component is expressed in percent by weight.

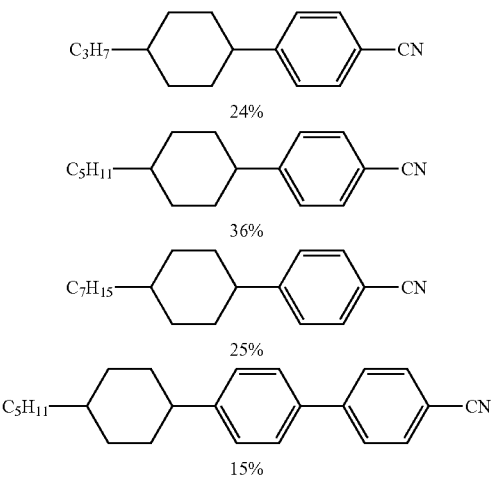

Characteristics were measured according to the methods described below. Most of the methods were applied as described in the Standard of the Japan Electronics and Information Technology Industries Association (hereinafter abbreviated to "JEITA"), JEITA EIAJ ED-2521B, discussed and established by JEITA, or are modified versions of methods described in the same.

Maximum Temperature of a Nematic Phase (NI; ° C.):

A sample was placed on a hot plate in a melting point apparatus equipped with a polarizing microscope and was heated at a rate of 1° C./ml. The temperature when a part of the sample began to change from a nematic phase to an isotropic liquid was measured. The higher limit of the temperature range of the nematic phase may be abbreviated as "maximum temperature."

Minimum Temperature of a Nematic Phase ($T_c$; ° C.):

Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c$<−20° C. The lower limit of the temperature range of the nematic phase may be abbreviated as "minimum temperature."

Viscosity (Bulk Viscosity; η; Measured at 20° C.; mPa·s):

A cone-plate (E type) rotational viscometer was used for measurement.

Viscosity (Rotational Viscosity; γ1; Measured at 25° C.; mPa·s):

Measurement was carried out according to the method described in M. Imai et al., *Molecular Crystals and Liquid Crystals*, Vol. 259, p. 37 (1995). A sample was put in a TN device in which a twist angle was 0 degrees and a distance (cell gap) between two glass substrates was 5 μm. A voltage was applied stepwise to the device in the range of 16 V to 19.5 V at an increment of 0.5 V. After a period of 0.2 second with no voltage application, a voltage was repeatedly applied under the conditions of only one rectangular wave (rectangular pulse; 0.2 second) and no voltage application (2 seconds). A peak current and a peak time of a transient current generated by the voltage application were measured. The value of rotational viscosity was obtained from the measured values and the calculation equation (8) described in page 40 of the paper of M. Imai et al. The value of dielectric anisotropy required of the calculation was determined by the method described below using the device used for the measurement of the rotational viscosity.

Optical Anisotropy (Refractive Index Anisotropy; Δn; Measured at 25° C.):

Measurement was carried out by an Abbe refractometer attached with a polarizing plate mounted on an ocular, using light at the wavelength of 589 nm. The surface of the main prism was rubbed in one direction, and then a sample was dripped onto the main prism. The refractive index $n_∥$ was measured when the direction of polarized light was parallel to the direction of rubbing. The refractive index $n_⊥$ was measured when the direction of polarized light was perpendicular to the direction of rubbing. The value of optical anisotropy was calculated with the equation "$Δn=n_∥-n_⊥$."

Dielectric Anisotropy (Δ∈; Measured at 25° C.):

A sample was put in a TN device in which a distance (cell gap) between two glass substrates was 9 μm and a twist angle was 80°. Sine waves (10 V, 1 kHz) were applied to the device, and after 2 seconds, the dielectric constant $∈_∥$ in the major axis direction of liquid crystal molecules was measured. Sine waves (0.5 V, 1 kHz) were applied to the device, and after 2 seconds, the dielectric constant $∈_⊥$ in the minor axis direction of the liquid crystal molecules was measured. The value of dielectric anisotropy was calculated by the equation "$Δ∈=∈_∥-∈_⊥$."

Threshold Voltage (Vth; Measured at 25° C.; V):

An LCD-5100 luminance meter made by Otsuka Electronics Co., Ltd. was used for the measurement. The light source was a halogen lamp. The sample was put in a normally white mode TN device in which a distance (cell gap) between two glass substrates was 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. The threshold voltage is the voltage at 90% transmittance.

Voltage Holding Ratio (VHR-1; Measured at 25° C.; %):

A TN device used for measurement had a polyimide alignment film, and a distance (cell gap) between two glass substrates was 5 μm. A sample was put in the device, and then the device was sealed with an ultraviolet-curable adhesive. A pulse voltage (60 microseconds at 5 V) was applied to the device and the device was charged. A decaying voltage was measured for 16.7 milliseconds with a high-speed voltmeter, and area A between a voltage curve and a horizontal axis in a unit cycle was determined. Area B is an area without decay. The voltage holding ratio is a percentage of area A to area B.

Voltage Holding Ratio (VHR-2; Measured at 80° C.; %):

A TN device used for measurement had a polyimide alignment film, and a distance (cell gap) between two glass substrates was 5 μm. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. The voltage holding ratio is a percentage of area A to area B.

Voltage Holding Ratio (VHR-3; Measured at 25° C.; %):

Stability to UV light was evaluated by measuring a voltage holding ratio after a device was irradiated with UV light. The TN device used for the measurement had a polyimide alignment film, and a cell gap of 5 μm. The sample was injected into the device, and then the device was irradiated with light for 20 minutes. The light source was an ultra high-pressure mercury lamp USH-500D (made by Ushio, Inc.), and a distance between the device and the light source was 20 centimeters. In measuring VHR-3, a decaying voltage was measured for 16.7 milliseconds. A composition having a large VHR-3 has a large stability to UV light. The value of VHR-3 is preferably 90% or more, and further preferably, 95% or more.

Voltage Holding Ratio (VHR-4; Measured at 25° C.; %):

A TN device into which a sample was injected was heated in a constant-temperature bath at 80° C. for 500 hours, and then the stability to heat was evaluated by measuring a voltage holding ratio. In measuring VHR-4, a decaying voltage was measured for 16.7 milliseconds. A composition having a large VHR-4 has a large stability to heat.

Response Time (τ; Measured at 25° C.; ms):

An LCD-5100 luminance meter made by Otsuka Electronics Co., Ltd. was used for measurement. The light source was a halogen lamp. The low-pass filter was set at 5 kHz. The sample was put in a normally white mode TN device in which a distance (cell gap) between two glass substrates was 5.0 μm and a twist angle was 80°. Rectangular waves (60 Hz, 5 V, 0.5 second) were applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. The rise time (τr; milliseconds) is the period of time needed for a change from 90% transmittance to 10% transmittance. The fall time (if; milliseconds) is the period of time needed for a change from 10% transmittance to 90% transmittance. A response time is a sum of the thus determined rise time and fall time.

Elastic Constant (K; Measured at 25° C.; pN):

HP4284A LCR Meter made by Yokogawa-Hewlett-Packard Co. was used for measurement. The sample was put in a horizontal alignment cell in which a distance (cell gap) between two glass substrates was 20 μm. A voltage in the range of 0 V to 20 V was applied to the cell, and electrostatic capacity and applied voltage were measured. Measured values of the electrostatic capacity (C) and the applied voltage (V) were fitted to equation (2.98) and equation (2.101) on page 75 of "Liquid Crystal Device Handbook" (The Nikkan Kogyo Shimbun, Ltd.), and the values of K11 and K33 were obtained from equation (2.99). Next, K22 was calculated using the previously determined values of K11 and K33 in equation (3.18) on page 171 of the same Handbook. The elastic constant is a mean value of the thus determined K11, K22 and K33.

Specific Resistance (ρ; Measured at 25° C.; Ωcm):

Into a vessel equipped with electrodes, 1.0 milliliter of a sample was injected. A DC voltage (10 V) was applied to the vessel, and a DC current after 10 seconds was measured. The specific resistance was calculated with the following equation: (specific resistance)={(voltage)×(electric capacity of a vessel)}/{(direct current)×(dielectric constant of vacuum)}.

Helical Pitch (P; Measured at Room Temperature; μm):

A helical pitch was measured according to a wedge method (Liquid Crystal Handbook, page 196, (issued in 2000, Maruzen Co., Ltd.)). The sample was injected into a wedge cell and left to stand at room temperature for 2 hours, and then the gap (d2−d1) between disclination lines was observed using a polarizing microscope (trade name: MM40/60 series, Nikon Corporation). The helical pitch (P) was calculated according to the following equation in which the angle of the wedge cell was expressed as θ:

$$P=2\times(d2-d1)\times\tan\theta.$$

Gas Chromatographic Analysis:

GC-14B Gas Chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C./min. A sample was prepared in an acetone solution (0.1 wt %), and then 1 μL of the solution was injected into the sample injector. The recorder was C-R5A Chromatopac made by Shimadzu Corporation or the equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

The proportions of liquid crystal compounds contained in the composition may be calculated by the method as described below. The liquid crystal compounds can be detected using a gas chromatograph. The ratio of the peak areas in the gas chromatogram corresponds to the ratio (in the number of moles) of the liquid crystal compounds. When the capillary columns described above were used, a correction coefficient of each of the liquid crystal compounds may be regarded as 1 (one). Accordingly, the proportions (wt %) of the liquid crystal compounds were calculated from the ratio of the peak areas.

The invention will be explained in detail by way of Examples described below, but is not limited by the same. The compounds in Comparative Examples and Examples were expressed using symbols according to the definitions in Table 3 below, where the configuration of 1,4-cyclohexylene is trans. The parenthesized number next to a symbolized compound corresponds to the number of the compound. The symbol (−) means any other liquid crystal compound. The proportion (percentage) of a liquid crystal compound is expressed in terms of weight percent (wt %) based on the total weight of the liquid crystal composition. The liquid crystal composition contains an impurity in addition. The values of the characteristics of the composition were summarized in the last part.

TABLE 3

Method for Description of Compounds using Symbols
$R—(A_1)—Z_1— \ldots —Z_n—(A_n)R'$

| 1) Left-terminal Group R— | Symbol |
|---|---|
| $C_nH_{2n+1}—$ | n- |
| $C_nH_{2n+1}O—$ | nO— |
| $C_mH_{2m+1}OC_nH_{2n}—$ | mOn— |
| $CH_2=CH—$ | V— |
| $C_nH_{2n+1}—CH=CH—$ | nV— |
| $CH_2=CH—C_nH_{2n}—$ | Vn— |
| $C_mH_{2m+1}—CH=CH—C_nH_{2n}—$ | mVn— |
| $CF_2=CH—$ | VFF— |
| $CF_2=CH—C_nH_{2n}—$ | VFFn— |

| 2) Right-terminal Group —R' | Symbol |
|---|---|
| $—C_nH_{2n+1}$ | -n |
| $—OC_nH_{2n+1}$ | —On |
| $—CH=CH_2$ | —V |
| $—CH=CH—C_nH_{2n+1}$ | —Vn |
| $—C_nH_{2n}—CH=CH_2$ | —nV |
| $—C_mH_{2m}—CH=CH—C_nH_{2n+1}$ | —mVn |
| $—CH=CF_2$ | —VFF |
| $—Cl$ | —CL |
| $—OCF_3$ | —OCF3 |
| $—CF_3$ | —CF3 |

| 3) Bonding Group $—Z_n—$ | Symbol |
|---|---|
| $—C_2H_4—$ | 2 |
| $—COO—$ | E |
| $—CH=CH—$ | V |
| $—CH_2O—$ | 10 |
| $—OCH_2—$ | 01 |
| $—CF_2O—$ | X |
| $—C\equiv C—$ | T |

| 4) Ring Structure $—A_n—$ | Symbol |
|---|---|
|  | H |
|  | B |
| 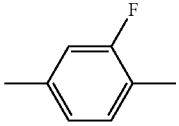 | B (F) |
| 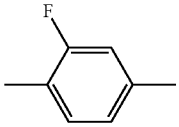 | B(2F) |
| 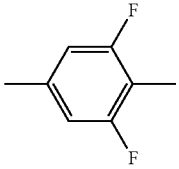 | B (F, F) |

TABLE 3-continued

Method for Description of Compounds using Symbols
R—(A$_1$)—Z$_1$—...—Z$_n$—(A$_n$)R'

| Structure | Symbol |
|---|---|
| (difluorobenzene) | B (2F, 5F) |
| (pyrimidine) | Py |
| (dioxane) | G |
| (pyran) | Dh |

5) Examples of Expression

Example 1 3-BB(F)B(F, F)-CF3

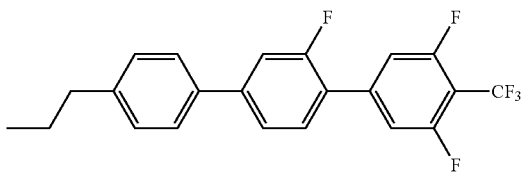 [SMILES: CCCc1ccc(-c2ccc(-c3cc(F)c(C(F)(F)F)c(F)c3)c(F)c2)cc1]

Example 2 3-BB(F)B(F, F)XE(F, F)-F

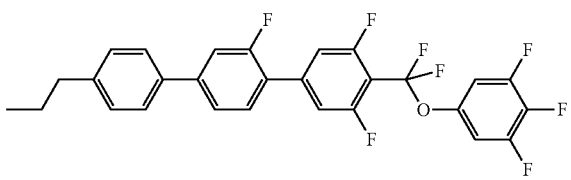 [SMILES: CCCc1ccc(-c2ccc(-c3cc(F)c(C(F)(F)Oc4cc(F)c(F)c(F)c4)c(F)c3)c(F)c2)cc1]

Example 3 3-HH-V

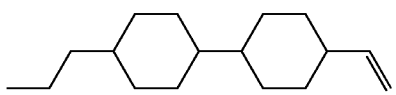 [SMILES: C=CC1CCC(C2CCC(CCC)CC2)CC1]

Example 4 V2-HHB-1

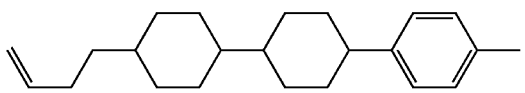 [SMILES: C=CCCC1CCC(C2CCC(c3ccc(C)cc3)CC2)CC1]

Example 1

| | | |
|---|---|---|
| 3-BB (F) B (F, F)-CF3 | (1-6-1) | 10% |
| V-HH-3 | (2-1-1) | 45% |
| V-HHB-1 | (2-5-1) | 10% |
| 1-BB (F) B-2V | (2-7-1) | 9% |
| 2-BB (F) B-2V | (2-7-1) | 5% |
| 3-BB (F) B-2V | (2-7-1) | 3% |
| 3-BB (F, F) XB (F, F)-F | (3-15-1) | 8% |
| 3-BB (F) B (F, F) XB (F, F)-F | (3-22-1) | 3% |
| 4-BB (F) B (F, F) XB (F, F)-F | (3-22-1) | 7% |

NI = 76.8° C.;
Tc < −30° C.;
Δn = 0.127;
Δε = 6.7;
Vth = 2.21 V;
η = 8.6 mPa · s.

Comparative Example 1

A liquid crystal composition was formulated in which the compound of the first component of the invention was replaced by compound (3-14-1) of the third component in the composition in Example 1. The composition was prepared and measured by the methods described above. The components and the characteristics of the composition are described below.

| | | |
|---|---|---|
| V-HH-3 | (2-1-1) | 45% |
| V-HHB-1 | (2-5-1) | 10% |
| 1-BB (F) B-2V | (2-7-1) | 9% |
| 2-BB (F) B-2V | (2-7-1) | 5% |
| 3-BB (F) B-2V | (2-7-1) | 3% |
| 3-BB (F) B (F, F)-F | (3-14-1) | 10% |
| 3-BB (F, F) XB (F, F)-F | (3-15-1) | 8% |
| 3-BB (F) B (F, F) XB (F, F)-F | (3-22-1) | 3% |
| 4-BB (F) B (F, F) XB (F, F)-F | (3-22-1) | 7% |

NI = 77.1° C.;
Tc < −20° C.;
Δn = 0.127;
Δε = 5.6;
Vth = 2.44 V;
η = 7.2 mPa · s.

The composition of Comparative Example 1 has a higher minimum temperature of nematic phase and a smaller positive dielectric anisotropy as compared to the composition of Example 1.

Example 2

| | | |
|---|---|---|
| 3-B (F) B (F, F)-CF3 | (1-5-1) | 3% |
| 3-BB (F) B (F, F)-CF3 | (1-6-1) | 4% |
| 3-BBB (F) B (F, F)-CF3 | (1-17-1) | 3% |
| 2-HH-3 | (2-1-1) | 5% |
| 3-HH-4 | (2-1-1) | 18% |
| 3-HB-O2 | (2-2-1) | 5% |
| 5-HB-O2 | (2-2-1) | 4% |
| 3-HHB-1 | (2-5-1) | 5% |
| 3-HHB-O1 | (2-5-1) | 4% |
| 3-B (F) BB-2 | (2-8-1) | 3% |
| 3-HB-CL | (3-1-1) | 7% |
| 3-HHB-CL | (3-4-1) | 5% |
| 3-HHXB (F, F)-F | (3-6-1) | 8% |
| 3-HHEB (F, F)-F | (3-8-1) | 3% |
| 3-HBEB (F, F)-F | (3-11-1) | 3% |
| 3-BB (F, F) XB (F, F)-F | (3-15-1) | 5% |
| 3-HBBXB (F, F)-F | (3-21-1) | 5% |
| 5-HBBXB (F, F)-F | (3-21-1) | 3% |
| 3-BB (F) B (F, F) XB (F, F)-F | (3-22-1) | 3% |
| 4-BB (F) B (F, F) XB (F, F)-F | (3-22-1) | 4% |

NI = 80.6° C.;
Tc < −20° C.;
Δn = 0.108;
Δε = 8.6;
Vth = 2.06 V;
η = 20.0 mPa · s.

Example 3

| | | |
|---|---|---|
| 3-BB (F, F)-CF3 | (1-4-1) | 4% |
| 3-BBB (F, F)-CF3 | (1-7-1) | 4% |
| 3-BB (F) B (F) B (F, F)-CF3 | (1-18-1) | 4% |
| 2-HH-3 | (2-1-1) | 10% |
| 3-HH-4 | (2-1-1) | 10% |
| 3-HH-5 | (2-1-1) | 5% |
| V2-BB-1 | (2-3-1) | 5% |
| 3-HHEH-5 | (2-4-1) | 3% |
| 1V2-HHB-3 | (2-5-1) | 5% |
| 5-HBB-2 | (2-6-1) | 5% |
| 3-HHEBH-5 | (2-10-1) | 3% |
| 3-HHB (F, F)-F | (3-5-1) | 8% |
| 3-HBB-F | (3-12-1) | 3% |
| 3-BB (F) B (F, F)-F | (3-14-1) | 5% |
| 3-BB (F, F) XB (F, F)-F | (3-15-1) | 6% |
| 3-HHBB (F, F)-F | (3-19-1) | 4% |
| 3-HHB (F) B (F, F)-F | (3-20-1) | 4% |
| 3-HB (F) B (F, F) XB (F, F)-F | (3-21-3) | 6% |
| 3-BB (F) B (F, F) XB (F, F)-F | (3-22-1) | 6% |

NI = 82.7° C.;
Tc < −20° C.;
Δn = 0.115;
Δε = 9.1;
Vth = 2.06 V;
η = 24.3 mPa · s.

Example 4

| | | |
|---|---|---|
| 3-B (F) B (F)-CF3 | (1-3-1) | 4% |
| 3-B (F) B (F) B (F)-CF3 | (1-8-1) | 5% |
| 3-BB (F, F) B (F)-CF3 | (1-14-1) | 5% |
| V-HH-3 | (2-1-1) | 23% |
| 1V-HH-3 | (2-1-1) | 7% |
| 7-HB-1 | (2-2-1) | 4% |
| V-HHB-1 | (2-5-1) | 8% |
| V2-HHB-1 | (2-5-1) | 8% |
| 5-HBBH-3 | (2-11-1) | 4% |
| 1V2-BB-F | (3-2) | 4% |
| 1V2-BB-CL | (3-3) | 4% |
| 3-HHXB (F)-OCF3 | (3-7-1) | 5% |
| 3-BB (F, F) XB (F)-OCF3 | (3-16-1) | 5% |
| 3-BB (F) XB (F)-F | (3-18-1) | 4% |
| 3-BB (F) B (F, F) XB (F)-F | (3-22-2) | 10% |

NI = 70.4° C.;
Tc < −20° C.;
Δn = 0.100;
Δε = 7.7;
Vth = 1.91 V;
η = 14.2 mPa · s.

Example 5

| | | |
|---|---|---|
| 3-BB (F)-CF3 | (1-1-1) | 4% |
| 3-BB (F) B (F)-CF3 | (1-9-1) | 4% |
| 3-BBB (F)-CF3 | (1-11-1) | 4% |
| V-HH-3 | (2-1-1) | 20% |
| 1V2-HH-3 | (2-1-1) | 10% |
| V-HHB-1 | (2-5-1) | 10% |
| 3-HB (F) HH-5 | (2-9-1) | 3% |
| 3-HGB (F, F)-F | (3-9-1) | 5% |
| 3-GHB (F, F)-F | (3-10-1) | 5% |
| 3-BB (F, F) XB (F, F)-F | (3-15-1) | 10% |
| 3-BBXB (F, F)-F | (3-17-1) | 10% |
| 3-HB (F) B (F, F) XB (F, F)-F | (3-21-3) | 5% |
| 3-BB (F) B (F, F) XB (F, F)-F | (3-22-1) | 5% |
| 3-GB (F) B (F, F) XB (F, F)-F | (3-24-1) | 5% |

NI = 77.3° C.;
Tc < −20° C.;
Δn = 0.120;
Δε = 10.3;
Vth = 1.83 V;
η = 18.0 mPa · s.

Example 6

| | | |
|---|---|---|
| 3-B (F) B-CF3 | (1-2-1) | 4% |
| 3-B (F) B (F) B-CF3 | (1-10-1) | 4% |
| 3-BB (F) B-CF3 | (1-12-1) | 4% |
| V-HH-4 | (2-1-1) | 17% |
| V-HH-5 | (2-1-1) | 7% |
| 1V-HH-4 | (2-1-1) | 4% |
| 3-HHB-O1 | (2-5-1) | 4% |
| 2-BB (F) B-3 | (2-7-1) | 4% |
| 2-BB (F) B-5 | (2-7-1) | 4% |
| 5-HBB (F) B-2 | (2-13-1) | 4% |
| 3-HBB (F, F)-F | (3-13-1) | 8% |
| 3-BB (F) B (F, F)-F | (3-14-1) | 4% |
| 3-BB (F, F) XB (F, F)-F | (3-15-1) | 8% |
| 3-HHBB (F, F)-F | (3-19-1) | 4% |
| 5-HHBB (F, F)-F | (3-19-1) | 4% |
| 3-HBBXB (F, F)-F | (3-21-1) | 4% |
| 5-HBBXB (F, F)-F | (3-21-1) | 4% |
| 3-BB (F) B (F, F) MB (F, F)-F | (3-22-1) | 4% |
| 4-BB (F) B (F, F) XB (F, F)-F | (3-22-1) | 4% |

NI = 86.4° C.;
Tc < −30° C.;
Δn = 0.134;
Δε = 8.7;
Vth = 2.21 V;
η = 25.9 mPa · s.

Example 7

| | | |
|---|---|---|
| 3-BB (F) B (F, F)-CF3 | (1-6-1) | 4% |
| 3-B (F) B (F, F) B (F, F)-CF3 | (1-16-1) | 4% |
| 3-BBB (F, F) B (F, F)-CF3 | (1-19-1) | 4% |
| 3-HH-4 | (2-1-1) | 25% |
| 3-HH-5 | (2-1-1) | 10% |
| 1-BB-3 | (2-3-1) | 5% |
| 3-HHB-1 | (2-5-1) | 8% |
| 3-HHB-3 | (2-5-1) | 5% |
| 5-HB (F) BH-3 | (2-12-1) | 3% |
| 3-HB-CL | (3-1-1) | 4% |
| 3-HHB-CL | (3-4-1) | 4% |
| 1-HHXB (F, F)-F | (3-6-1) | 4% |
| 3-HBBXB (F, F)-F | (3-21-1) | 6% |
| 3-HBB (F, F) XB (F, F)-F | (3-21-2) | 5% |
| 3-BB (F) B (F, F) XB (F, F)-F | (3-22-1) | 5% |
| 3-B (F) B (F, F) XB (F) B (F, F)-F | (3-23-1) | 4% |

NI = 92.1° C.;
Tc < −30° C.;
Δn = 0.114;
Δε = 9.3;
Vth = 2.28 V;
η = 19.8 mPa · s.

Example 8

| | | |
|---|---|---|
| 3-BB (F) B (F, F)-CF3 | (1-6-1) | 4% |
| 3-B (F) BB-CF3 | (1-13-1) | 3% |
| 3-B (F) B (F, F) B (F)-CF3 | (1-15-1) | 3% |
| V-HH-3 | (2-1-1) | 20% |
| 2-HH-3 | (2-1-1) | 5% |
| VFF-HH-3 | (2-1) | 5% |
| 3-HH-O1 | (2-1-1) | 5% |
| 3-HB-O1 | (2-2-1) | 5% |
| V-HHB-1 | (2-5-1) | 8% |
| 1V2-HHB-1 | (2-5-1) | 4% |
| VFF-HHB-1 | (2-5) | 3% |
| 5-B (F) BB-2 | (2-8-1) | 3% |
| 3-BB (F, F) XB (F, F)-F | (3-15-1) | 5% |
| 3-BBXB (F, F)-F | (3-17-1) | 5% |
| 3-HBBXB (F, F)-F | (3-21-1) | 5% |
| 3-HB (F) B (F, F) XB (F, F)-F | (3-21-3) | 5% |
| 3-BB (F) B (F, F) XB (F, F)-F | (3-22-1) | 6% |
| 3-Py-BB-F | (3) | 3% |
| 1O1-HBBH-5 | (-) | 3% |

NI = 81.2° C.;
Tc < −20° C.;
Δn = 0.118;
Δε = 7.2;
Vth = 2.27 V;
η = 15.0 mPa · s.

Example 9

| | | |
|---|---|---|
| V2-BB (F) B (F, F)-CF3 | (1-6-1) | 4% |
| V2-BB (F) B (F)-CF3 | (1-9-1) | 4% |
| 2-HH-5 | (2-1-1) | 5% |
| V-HH-4 | (2-1-1) | 10% |
| V-HH-5 | (2-1-1) | 10% |
| 1V2-HH-2 | (2-1-1) | 5% |
| V2-B (F) BB-2 | (2-8-1) | 4% |
| 2-B (F) BB-2V | (2-8-1) | 4% |
| 3-HHXB (F, F)-F | (3-6-1) | 9% |
| 3-HBB (F, F)-F | (3-13-1) | 10% |
| 3-BBXB (F, F)-F | (3-17-1) | 9% |
| 3-HHBB (F, F)-F | (3-19-1) | 5% |
| 3-HBBXB (F, F)-F | (3-21-1) | 6% |
| 5-HBBXB (F, F)-F | (3-21-1) | 5% |
| 3-BB (F) B (F, F) XB (F, F)-F | (3-22-1) | 6% |
| 4-BB (F) B (F, F) XB (F, F)-F | (3-22-1) | 4% |

NI = 86.7° C.;
Tc < −20° C.;
Δn = 0.131;
Δε = 8.5;
Vth = 2.23 V;
η = 23.5 mPa · s.

The compositions in Examples 1 to 9 have a larger positive dielectric anisotropy in comparison with the composition according to Comparative Example 1. Therefore, the liquid crystal composition of the present invention has further excellent characteristics.

INDUSTRIAL APPLICABILITY

The invention concerns a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a large elastic constant, a high stability to ultraviolet light and a high stability to heat, or a liquid crystal composition having a suitable balance regarding at least two of the characteristics. A liquid crystal display device including such a composition is applied to constitute an AM device having a short response time, a large voltage holding ratio, a large contrast ratio, a long service life and so forth, and thus can be used for a liquid crystal projector, a liquid crystal television and so forth.

The invention claimed is:

1. A liquid crystal composition that has a nematic phase and contains at least one compound selected from the group of compounds represented by formula (1) as a first component and at least one compound selected from the group of compounds represented by formula (2) as a second component simultaneously, the second component contains at least one compound selected from the group of compounds represented by formula (2-1):

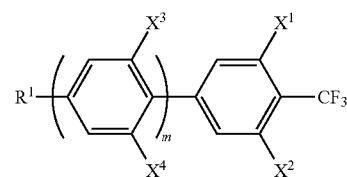

(1)

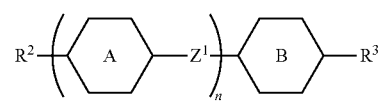

(2)

(2-1)

wherein $R^1$ is alkyl having 1 to 12 carbons, alkoxy having 1 to 12 carbons or alkenyl having 2 to 12 carbons, and $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine; ring A and ring B are independently 1,4-cyclohexylene, 1,4-phenylene, 2-fluoro-1,4-phenylene, 3-fluoro-1,4-phenylene or 2,5-difluoro-1,4-phenylene; $Z^1$ is independently a single bond, ethylene or carbonyloxy; $X^1, X^2, X^3$ and $X^4$ are independently hydrogen or fluorine; and m and n are independently 1, 2 or 3.

2. The liquid crystal composition of claim 1, wherein the first component is at least one compound selected from the group of compounds represented by formulae (1-1) to (1-19):

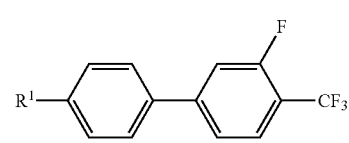

(1-1)

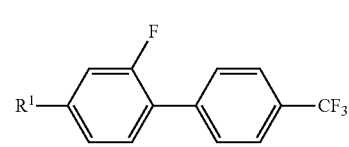

(1-2)

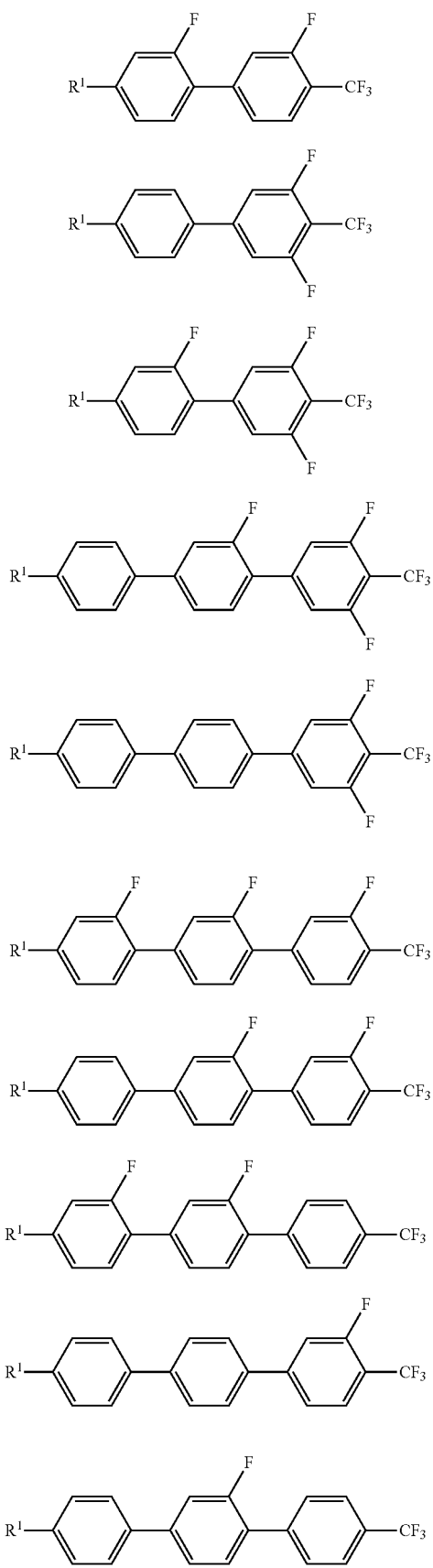
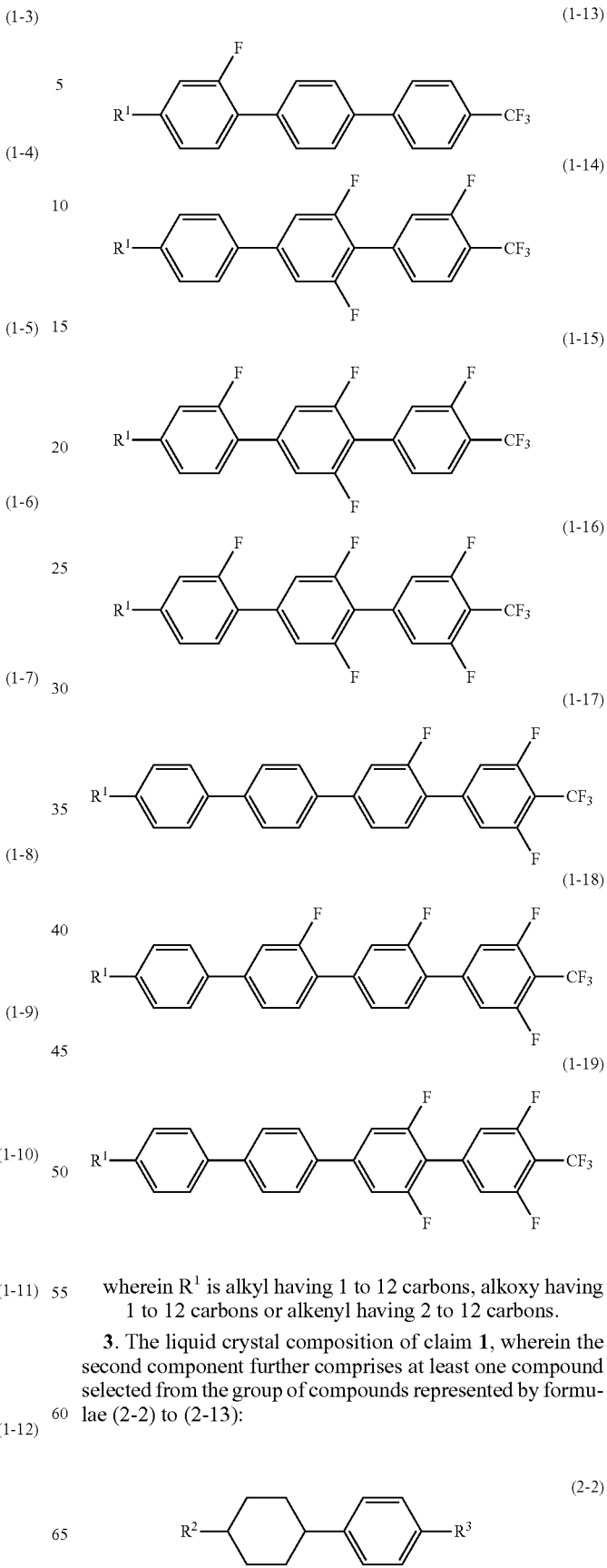
wherein R¹ is alkyl having 1 to 12 carbons, alkoxy having 1 to 12 carbons or alkenyl having 2 to 12 carbons.
3. The liquid crystal composition of claim 1, wherein the second component further comprises at least one compound selected from the group of compounds represented by formulae (2-2) to (2-13):
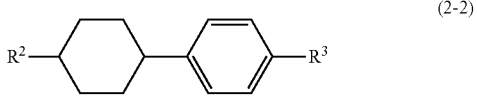

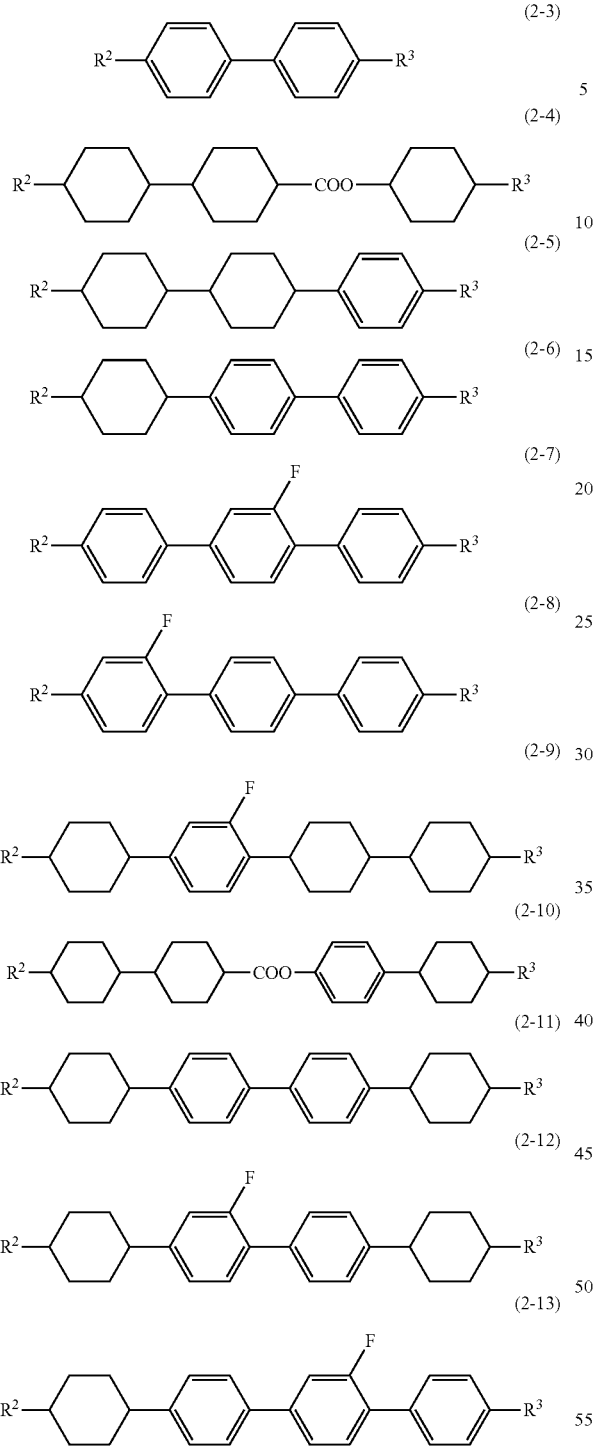

wherein $R^2$ and $R^3$ are independently alkyl having 1 to 12 carbons, alkoxy having 1 to 12 carbons, alkenyl having 2 to 12 carbons, or alkenyl having 2 to 12 carbons in which at least one hydrogen is replaced by fluorine.

4. The liquid crystal composition of claim 1, wherein a proportion of the first component is in a range of 3 wt % to 25 wt % and a proportion of the second component is in a range of 25 wt % to 97 wt %, based on a total weight of the liquid crystal composition.

5. The liquid crystal composition of claim 1, further containing at least one compound selected from the group of compounds represented by formula (3) as a third component:

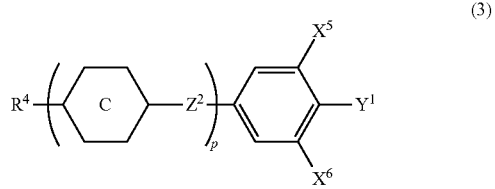

wherein $R^4$ is alkyl having 1 to 12 carbons, alkoxy having 1 to 12 carbons or alkenyl having 2 to 12 carbons; ring C is 1,4-cyclohexylene, 1,4-phenylene, 2-fluoro-1,4-phenylene, 3-fluoro-1,4-phenylene, 3,5-difluoro-1,4-phenylene, 1,3-dioxane-2,5-diyl, tetrahydropyran-2,5-diyl or pyrimidine-2,5-diyl; $Z^2$ is a single bond, difluoromethyleneoxy, ethylene or carbonyloxy; $X^5$ and $X^6$ are independently hydrogen or fluorine; $Y^1$ is fluorine, chlorine or trifluoromethoxy; and p is 1, 2, 3 or 4.

6. The liquid crystal composition of claim 5, wherein the third component is at least one compound selected from the group of compounds represented by formulae (3-1) to (3-24):

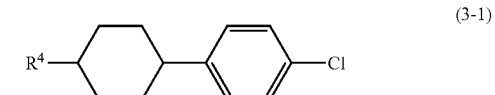

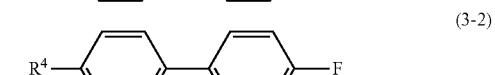

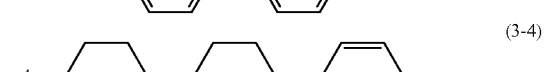

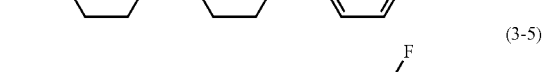

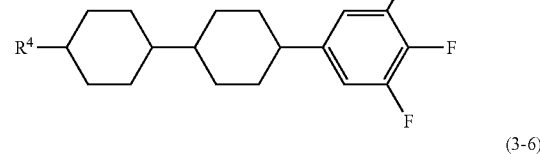

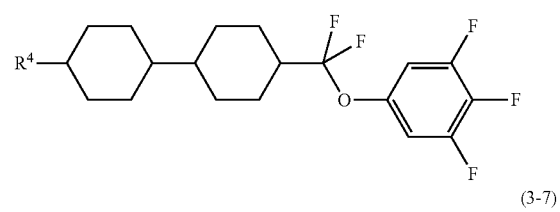

(3-8) 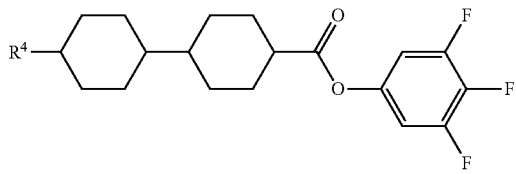
(3-9) 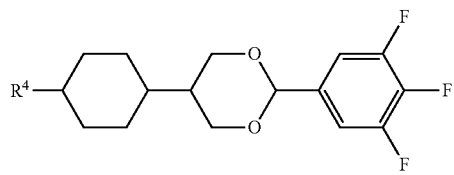
(3-10) 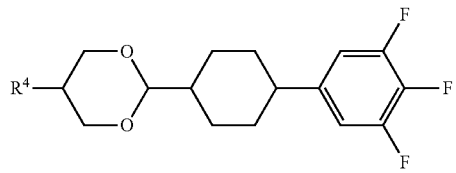
(3-11) 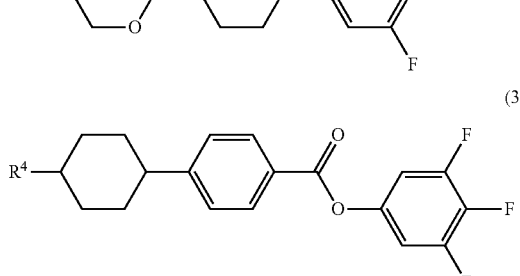
(3-12) 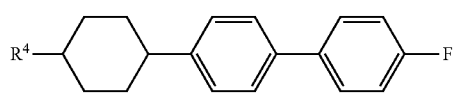
(3-13) 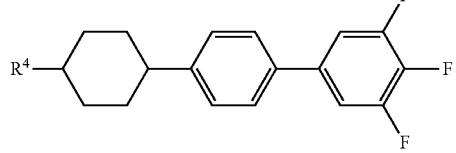
(3-14) 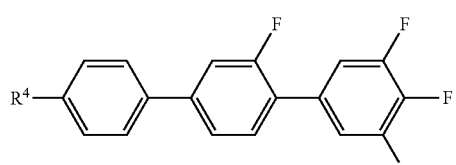
(3-15) 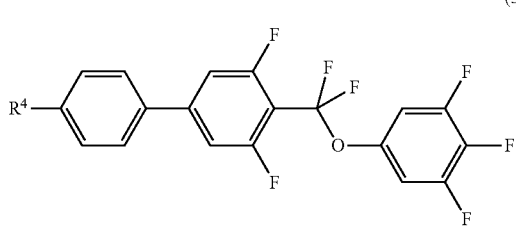
(3-16) 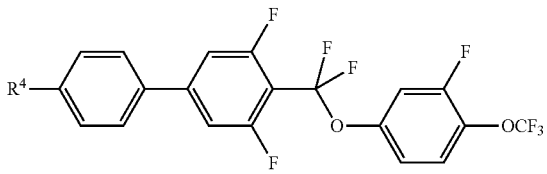
(3-17) 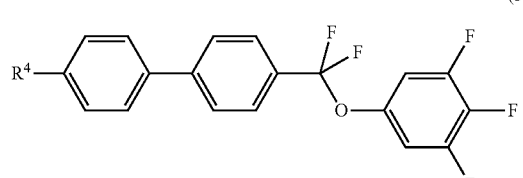
(3-18) 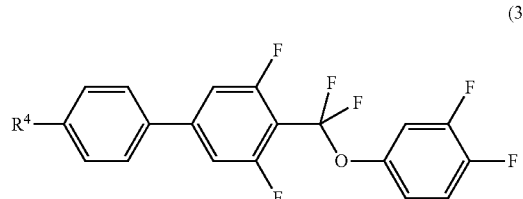
(3-19) 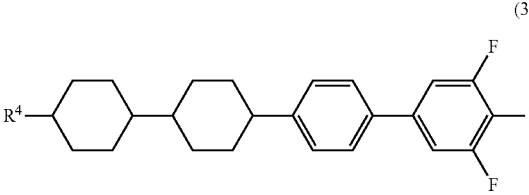
(3-20) 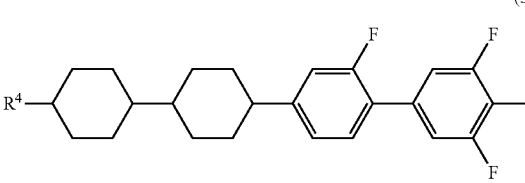
(3-21) 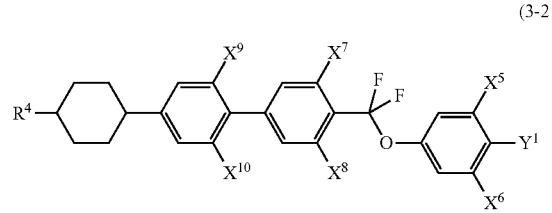
(3-22) 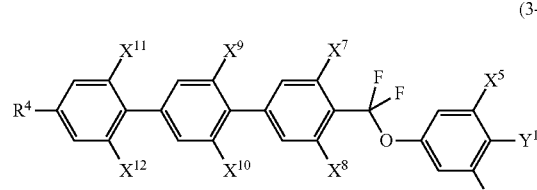
(3-23) 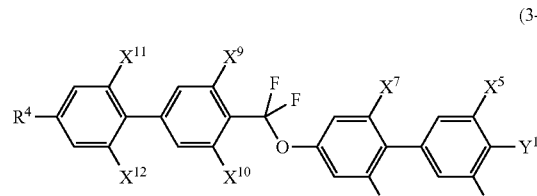

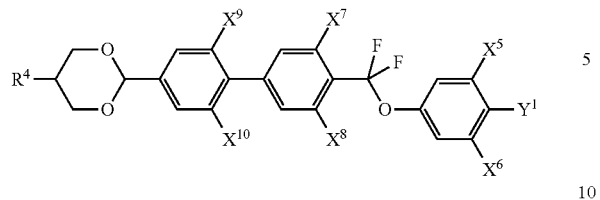

(3-24)

wherein $R^4$ is alkyl having 1 to 12 carbons, alkoxy having 1 to 12 carbons or alkenyl having 2 to 12 carbons; $X^5$, $X^6$, $X^7$, $X^8$, $X^9$, $X^{10}$, $X^{11}$ and $X^{12}$ are independently hydrogen or fluorine; and $Y^1$ is fluorine, chlorine or trifluoromethoxy.

7. The liquid crystal composition of claim 5, wherein a proportion of the third component is in a range of 5 wt % to 65 wt % based on a total weight of the liquid crystal composition.

8. The liquid crystal composition of claim 1, of which a maximum temperature of a nematic phase is 70° C. or higher, an optical anisotropy (25° C.) at a wavelength of 589 nanometers is 0.07 or more, and a dielectric anisotropy (25° C.) at a frequency of 1 kHz is 2 or more.

9. A liquid crystal display device including the liquid crystal composition of claim 1.

10. The liquid crystal display device of claim 9, of which an operating mode is a TN mode, an ECB mode, an OCB mode, an IPS mode, a PSA mode or an FPA mode, and a driving mode is an active matrix mode.

11. Use of the liquid crystal composition of claim 1 in a liquid crystal display device.

\* \* \* \* \*